United States Patent

Sollars

[19]

[11] Patent Number: 6,081,880
[45] Date of Patent: Jun. 27, 2000

[54] PROCESSOR HAVING A SCALABLE, UNI/MULTI-DIMENSIONAL, AND VIRTUALLY/PHYSICALLY ADDRESSED OPERAND REGISTER FILE

[75] Inventor: Donald Sollars, Milpitas, Calif.

[73] Assignee: LSI Logic Corporation, Milpitas, Calif.

[21] Appl. No.: 08/401,411

[22] Filed: Mar. 9, 1995

[51] Int. Cl.$^7$ ........................................... G06F 9/34
[52] U.S. Cl. ........................................... 711/202; 345/516
[58] Field of Search ........................................... 345/820, 476, 345/477, 483, 495, 412, 413, 388, 563, 569, 387, 570, 571, 800.04, 800.09, 800.24; 711/206, 214, 220

[56] References Cited

U.S. PATENT DOCUMENTS

| | | | |
|---|---|---|---|
| 4,038,533 | 7/1977 | Dummermuth et al. | 364/136 |
| 4,071,887 | 1/1978 | Daly et al. | 364/200 |
| 4,354,228 | 10/1982 | Moore et al. | 364/200 |
| 4,434,461 | 2/1984 | Puhl | 364/200 |
| 4,488,227 | 12/1984 | Miu et al. | 395/375 |
| 4,766,566 | 8/1988 | Chuang | 395/800.23 |
| 4,965,801 | 10/1990 | Dulac | 371/40.1 |
| 5,062,073 | 10/1991 | Masuda et al. | 395/856 |
| 5,083,263 | 1/1992 | Joy et al. | 395/800 |
| 5,159,678 | 10/1992 | Wengelski et al. | 395/425 |
| 5,179,530 | 1/1993 | Genusov et al. | 395/726 |
| 5,255,366 | 10/1993 | Chia et al. | 345/516 |
| 5,313,648 | 5/1994 | Ehlig et al. | 395/569 |
| 5,386,563 | 1/1995 | Thomas | 395/650 |
| 5,398,322 | 3/1995 | Marwood | 711/217 |
| 5,467,459 | 11/1995 | Alexander et al. | 395/480 |
| 5,493,687 | 2/1996 | Garg et al. | 395/800 |
| 5,495,615 | 2/1996 | Nizar et al. | 395/733 |
| 5,513,366 | 4/1996 | Agarwal et al. | 395/800 |
| 5,517,648 | 5/1996 | Bertone | 395/732 |
| 5,535,404 | 7/1996 | Tsubota | 395/800 |
| 5,546,554 | 8/1996 | Yung et al. | 711/203 |
| 5,553,301 | 9/1996 | New et al. | 395/825 |
| 5,586,275 | 12/1996 | Ehlig et al. | 395/564 |
| 5,611,064 | 3/1997 | Maund et al. | 395/419 |
| 5,630,102 | 5/1997 | Johnson et al. | 395/500 |

OTHER PUBLICATIONS

Blihowski et al. "A Shared Memory Model Based on the Dataflow Paradigm," IEEE, Jan. 1995, pp. 68–75.

A Three Dimensional Register File for Superscalar Processors; authors Marc Tremblay, Bill Joy & Ken Shin; Proceedings of the 28th Annual Hawaiian International Conference on System Science, Jan. 1995.

Motorola (Enhanced 32–bit microprocessor user's manual), pp. 6–1 to 6–5, Jun. 1989.

Motorola "Enhanced 32–bit microprocessor user's manual" 8–6 to 8–7 and 10–1 to 10–3, 1989.

DEC "DECchip 21064–AA Microprocessor Hardware reference manual" 3–1 to 3–2, 1992.

*Primary Examiner*—John A. Follansbee
*Attorney, Agent, or Firm*—Pillsbury, Madison & Sutro LLP; Mark J. Danielson

[57] ABSTRACT

A processor is implemented with an operand register file having N operand registers, instructions that reference these operand registers with virtual and physical source and destination addresses of variable up to n addressing dimensions, and at least one address mapping circuit that maps the uni-dimensional virtual and the multi-dimensional virtual/physical source and destination addresses to their uni-dimensional equivalents. Whether a source/destination address is a virtual or a physical address may be implicitly inferred from the instruction type, or explicitly specified. Source and destination addresses of an instruction may be either all virtual addresses, or all physical addresses, or virtual as well as physical addresses. The addressing dimension of an instruction's source and destination addresses may be specified in the instruction, or specified in a control register of the processor. All portions of a virtual/physical source/destination address may be specified in an instruction, or some portions are specified through control registers of the processor. As a result, various upward compatible embodiments, scaled to various performance design points suitable for multi-scalar, vector, and/or multi-processing, as well as software pipelined load, calculate, and store processing can be created.

28 Claims, 14 Drawing Sheets

Control Registers 20c

| | |
|---|---|
| PC | 42 |
| RET_PC | 44 |
| ADDR_DIM | 46 |
| ... | |
| SET_PTR_0 | 48a |
| SET_PTR_1 | 48b |
| ... | |
| SET_PTR_P | 48* |
| FLOX_PTR_0 | 50a |
| FLOX_PTR_1 | 50b |
| ... | |
| FLOX_PTR_* | 50* |

FIG. 6C

Control Registers 20b

| | |
|---|---|
| PC | 42 |
| RET_PC | 44 |
| ADDR_DIM | 46 |
| ... | |
| SET_PTR_0 | 48a |
| SET_PTR_1 | 48b |
| ... | |
| SET_PTR_P | 48* |

FIG. 6B

Control Registers 20a

| | |
|---|---|
| PC | 42 |
| RET_PC | 44 |
| ADDR_DIM | 46 |
| FLOX/SET_PTR | 48 |
| ... | |

FIG. 6A

PROCESSOR HAVING A SCALABLE, UNI/MULTI-DIMENSIONAL, AND VIRTUALLY/PHYSICALLY ADDRESSED OPERAND REGISTER FILE

BACKGROUND OF THE INVENTION

1. Field of the Invention

The present invention relates to the field of computer systems. More specifically, the present invention relates to processors of computer systems, their instruction set and associated register architecture.

2. Background Information

The performance of a processor is directly tied to its Instruction Set Architecture (ISA), which in turn is significantly dependent on the associated register file architecture, since execution is carried out by performing operations defined by the instructions, upon data which is typically held in the register file. Thus, if a particular register file architecture has inherent limitation(s), a processor implementation of the associated ISA would have difficulty in obtaining the desired performance.

Historically, when integrated circuit technology was still in its infancy, the earliest "register file" architectures were all centered around a single register, also known as the accumulator. A particular example of an accumulator-based architecture is the Motorola 68xx. Typically, under these architectures, almost every operation defined by the instruction set would use the accumulator as both the operand source (hereinafter simply source) and the destination for the result of the operation (hereinafter simply destination), thus creating significant data flow congestion. These architectures offered the advantage of compact instruction encoding, but the constraint of a single register made it virtually impossible to offer a high performance implementation or take advantage of advances in large scale integration.

Later architectures tend to offer linearly addressed register files having multiple registers. Some architectures would offer multiple linearly addressed register files, one for integer operations, and another for floating point operations. Additionally, a small number of control registers would also be included. These control registers are not used to store data variables. Instead, they are used to store status information about the processor to facilitate control of the overall operation of the processor.

The number of registers offered in a linearly addressed register file varies from architecture to architecture, but typically 32 or less integer registers are offered, and optionally another 32 or less floating point registers may be offered. These registers are usually numbered as R0 through R31 and are directly addressed (i.e. physically addressed). Examples of such linearly addressed register file architectures include MIPS®, Alpha® and PowerPC™[1].

[1] MIPS and ALPHA are the registered trademark of MIPS Computer Inc., and Digital Equipment Corporation respectively; whereas PowerPC is a trademark of International Business Machine.

All three architectures define 32 registers each in separate integer and floating point register files. The width of a single datum is variable, but an instruction can specify up to two of the registers as sources, and a third register as the destination. Each architecture also offers a small set of control registers that can be manipulated via special instructions that require privileges to execute, or are otherwise outside the scope of normal operation of the processor.

The availability of 32 registers significantly reduces the data flow congestion into and out of the register files. However, as processor operations become deeply pipelined, and superscalar processors become the norm, these 32-register register file architectures again begin to be stressed to their inherent limitations. A typical instruction in a RISC microprocessor will use three registers in its execution, two for the sources and one for the destination. Thus, a four-scalar microprocessor can require the processing of 12 operands in parallel to execute the four instructions.

A pipelined microprocessor attempts to improve system performance by executing several instructions in parallel. The four phases of execution, i.e. fetch, decode, execute, and writeback, are arbitrarily subdivided into a number of pipeline stages that operate concurrently. If the execution of an instruction can be broken down into n equal stages, the clock cycle of the system could also be divided by n, thereby improving the maximum possible system throughput by n times. Thus, high performance microprocessors tend to be heavily pipelined to achieve maximum system performance. However, as the pipeline becomes deeper, more data must be operated on in parallel. The four-scalar microprocessor described above would require the coordination of up to 36 operands if three pipe stages were required to encompass the decoding of source operands to the writing back of the result data. For an eight-scalar microprocessor coordination of 72 operands could be required. These register requirements are more than the 32-register register file architectures can meet.

As a result, most super-scalar and deeply pipelined microprocessors adopt highly complex schemes to handle and process multiple values of the same register location simultaneously. However, the inherent limitations of these conventional linearly addressed 32-register register file architectures will cause them to eventually suffer the same congestion problems faced by the earlier accumulator-based architectures.

In addition to the basic data traffic flow problem, some architectures have adopted novel approaches to solve a problem commonly faced in integer operations. It is standard programming practice to subdivide the software problem into basic blocks called functions. A program can define a set of functions to address the individual portions of the overall problem, and can call upon these functions in the appropriate order to solve the problem in a "divide and conquer" manner. To efficiently use these functions, the program invoking the function must pass input data to the function, and must receive return data from the function. Thus, the need for a message-passing construct is implicit.

The SPARC®[2] architecture addresses this issue by providing "register windows". The register file is segregated into groups of eight registers. One of these groups is designated as the global registers, while the other groups are "windowed" registers. At any given time, an instruction has access to the global group and three groups of "windowed" registers, for a total of 32 registers.

[2] SPARC is a registered trademark of SPARC International. The global registers are always visible to software, while the other three groups can change as a function of the value held in a variable called the "current_window_pointer" (cwp). The three groups of "windowed" registers are designated as Out's, Locals, and In's. Efficient parameter passing to/from function calls is implemented by defining the register windows to overlap. The group of registers designated as In's for a cwp value of two would correspond to the group of registers that would be designated as the Out's for a cwp value of three. Likewise, the group of registers that would be designated as the Out's for a cwp value of two would also correspond to the In's for a cwp value of one.

Thus, each In or Out register must be capable of recognizing two addresses for itself, depending upon the value of the cwp. Since the globals are always available, they are independent of the cwp; while the Local registers change with the cwp, they do not overlap between windows. The cwp can be incremented or decremented by user software, but an arbitrary window of registers can only be selected by supervisor software. The dual addressing requirement for the In/Out register group makes cwp changes difficult to efficiently implement in hardware, but the capability of passing parameters to/from function calls reduces the number of memory references that are required, and thus improves system performance. Register windows do not solve the register pressure issue that arises from only having 32 available registers. Hence, highly superscalar processors still face the same challenges in optimizing system performance.

Another problem certain register architectures have been configured to address is a class of applications that are highly parallel by the nature of the problem to be solved. These systems attempt to improve processing efficiency by grouping variables with similar processing requirements into a single quantity that is termed a "vector". The register architecture would provide vector registers, with each vector register capable of storing two or more variables (also referred to as elements or tuples of the vector). A vector register file is comprised of two or more such vector registers. A particular example of a vector processor is the Cray-1.

The Cray-1 has eight vector registers of 64 elements per vector register. Instead of requiring individual instructions to perform a given computation on individual pieces of data, hardware can construe a single vector instruction to perform the defined operation individually on all 64 corresponding pairs of data in two vector registers. The 64 results can then be written into a third vector register. This single-instruction-multiple-data (SIMD) approach is very effective for operating on data arrays where each element of the array can be treated identically. A single controlling mechanism can be defined to coordinate the processing of a large quantity of data.

Vectors offer a substantial reduction in complexity and can achieve high performance for applications that are vectorizable. But, systems that offer only vector processing can suffer large performance penalties in code that requires even a small amount of non-vector (i.e. scalar) processing. Thus, vector systems are often relegated to scientific applications where large arrays of data are processed in batch mode. They are not found in mainstream applications because of the limitation of only being able to efficiently execute parallel code.

Yet another problem that is commonly faced, but most register architectures have offered only minimal support is the problem of multi-processing, wherein multiple processes are executed at the same time. As a result, data must be provided to multiple independent contexts at the same time. However, except for basic context switching, traditionally the majority of the burden for supporting multi-processing has been borne by the operating systems.

Thus, it would be desirable if a processor can be implemented with an ISA having an associated register architecture that has a very high bandwidth to meet the data requirements of superscalar processors, supporting maximum instruction issue rate at the highest possible clock frequency. Additionally, it would be desirable if the register architecture would facilitate parameter passing to a function call, operate as either a vector/scalar register file, and provide data to multiple independent contexts, all with very low latency and minimal loss of efficiency, switching back and forth from the various types of scalar, vector and multi-processing. Furthermore, it would be desirable if the register architecture would be highly scalable, allowing a wide range of upward compatible embodiments to be manufactured. As will be disclosed in more detail below, these and other desirable results are advantageously achieved by the present invention of a processor implemented with an ISA having an associated scalable, uni/multi-dimensional, and virtually/physically addressed register architecture.

SUMMARY OF THE INVENTION

A processor is implemented with an operand register file having a number of operand registers, instructions that reference these operand registers with virtual or physical source and destination addresses of variable addressing dimensions, and at least one address mapping circuit that maps the uni-dimensional virtual and the multi-dimensional virtual/physical source and destination addresses to their uni-dimensional physical equivalents. Preferably, at least three address mapping circuits are provided to facilitate concurrent mapping of one destination and two source addresses.

For a particular embodiment, the number of operand registers (N) provided and the largest number of addressing dimensions (n) employable by the referencing source/destination addresses are predetermined. Typically, N is scaled proportionally to n. Each instruction may reference the N operand registers virtually, using up to n−1 addressing dimensions, i.e. 1-D, 2-D, . . . or (n−1)-D virtual addresses, or physically, using up to n addressing dimensions, i.e. 1-D, 2-D, . . . or n-D physical addresses. Up to v1 virtual files of v2, v3×v4, v5×v6×v7 . . . virtual operand registers are available under 1-D, 2-D, 3-D . . . virtual addressing respectively; whereas one physical file of N, p1×p2, p3×p4×p5 . . . physical operand registers are available under 1-D, 2-D, 3-D . . . physical addressing respectively (v's and p's are factors of N). In some embodiments, v's and p's are all geometric factors of $(N)^{1/n}$, i.e. $(N)^{1/n}$, $(N)^{2/n}$, $(N)^{3/n}$ etc.

For example, one embodiment may be provided with 64 operand registers and up-to-two addressing dimensions. For this embodiment, an instruction may refer to the 64 operand registers, virtually, using 1-D virtual addresses, or physically, using 1-D or 2-D physical addresses. Up to 8 virtual files of 8 virtual operand registers are available under 1-D virtual addressing, whereas one physical file of 64 and 8×8 physical operand registers are available under 1-D and 2-D physical addressing respectively.

The size of the instructions is also predetermined. Typically, it is also scaled proportionally to N and n. For example, relatively small 16-bit instructions would be employed for the above described 64-operand registers and up-to-2-D addressing embodiment.

Each virtual source/destination address is provided to an address mapping circuit in n−1 predetermined ordered portions, whereas each physical source/destination address is provided to an address mapping circuit in n predetermined ordered portions. Along with each virtual source/destination address, an address mapping circuit is further provided with a base operand register address as the nth ordered portion. Typically, the base operand register address is stored in a control register of the processor. Additionally, along with each source/destination address, an address mapping circuit is further provided with the addressing dimension of the source/destination address. Accordingly, the address mapping circuit maps the uni/multi-dimensional virtual/physical source/destination address to its uni-dimensional physical equivalent by selectively translating and/or combining the various ordered portions, and then summing the translated and/or combined portions.

In some embodiments, whether a source/destination address is a virtual or a physical address is implicitly inferred from the instruction type, whereas in other embodiments, it is explicitly specified. In some embodiments, source and destination addresses of an instruction are either all virtual addresses, or all physical addresses, whereas in other embodiments, the source/destination addresses include virtual as well as physical addresses. In some embodiments, the addressing dimension of an instruction's source and destination addresses is specified in the instruction, whereas, in other embodiments, it is specified in a control register of the processor. In some embodiments, all n–1 portions of a virtual and all n portions of a physical source/destination address are specified in an instruction, whereas, in other embodiments, one or more higher ordered portions are specified through control registers of the processor.

As a result, various upward compatible embodiments, scaled to various performance design points suitable for multi-scalar, vector, and/or multi-processing as well as software pipelined load, calculate, and store processing, can be created. For examples, for the above described 64 operand registers and up-to-two addressing dimensions embodiment, the 64 operand registers may be referenced 1-D physically, making 64 physical operand registers available for multi-scalar processing, or 1-D virtually, making up to 8 virtual files of 8 virtual operand registers available for 8-context multi-processing or software pipelined load, calculate, and store processing, or 2-D physically, making one physical file of 8×8 physical operand registers available for 8-tuple vector processing.

BRIEF DESCRIPTION OF DRAWINGS

The present invention will be described by way of exemplary embodiments, but not limitations, illustrated in the accompanying drawings in which like references denote similar elements, and in which:

FIGS. 6a–6e illustrate various embodiments of the control register file of FIG. 1.

DETAILED DESCRIPTION OF THE INVENTION

In the following description, the essential elements of the present invention will be described first, and their utilizations for various processing, such as multi-scalar, vector and multi-processing are then described. For purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
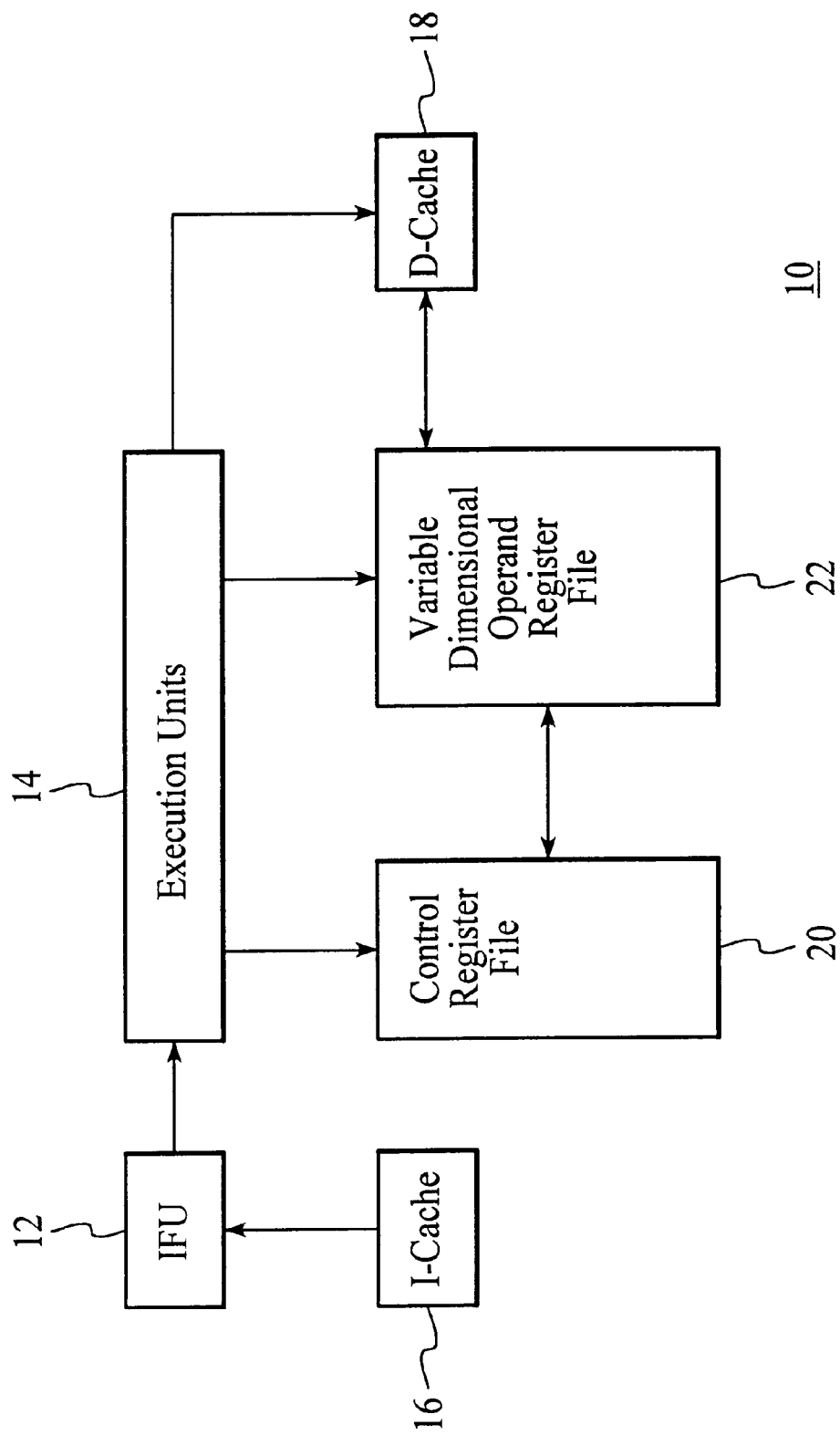
FIG. 1 illustrates the processor of the present invention.

Referring now to FIG. 1, the major functional blocks of processor of the present invention is illustrated. Processor 10 includes operand register file 22 of the present invention, and execution units 14 and control register file 20 incorporated with the teachings of the present invention. Additionally, processor 10 includes conventional elements such as instruction fetch unit (IFU) 12, instruction cache (I-cache) 16, and data cache (D-cache) 18. These elements are coupled to each other as shown. IFU 12, I-cache 16 and D-cache 18 perform their conventional functions in conventional manners, which are well known and will not be further described.

Operand register file 22 includes a number of registers for performing the conventional function of storing instruction operands in a new innovative manner. Preferably, operand register file 22 is used to store integer as well as floating point operands. However, based on the description to follow, it will be obvious to those skilled in the art, the present invention may also be practiced by providing separate operand register file 22 for integer and floating point operands, provided the integer and floating point execution units 14 are coupled to these separate operand register files 22 accordingly.

Execution units 14 and control register file 20 perform their respective conventional functions of executing instructions and storing control and status information, but also in a new innovative manner. As will be described in more detail below, under the present invention, instructions executed by execution unit 14 may reference the operand registers with virtual or physical source and destination addresses of variable addressing dimensions. Furthermore, execution units 14 include at least one address mapping circuit that maps the uni-dimensional virtual address and the multi-dimensional virtual/physical addresses to their uni-dimensional physical equivalents.

Figure 2A:
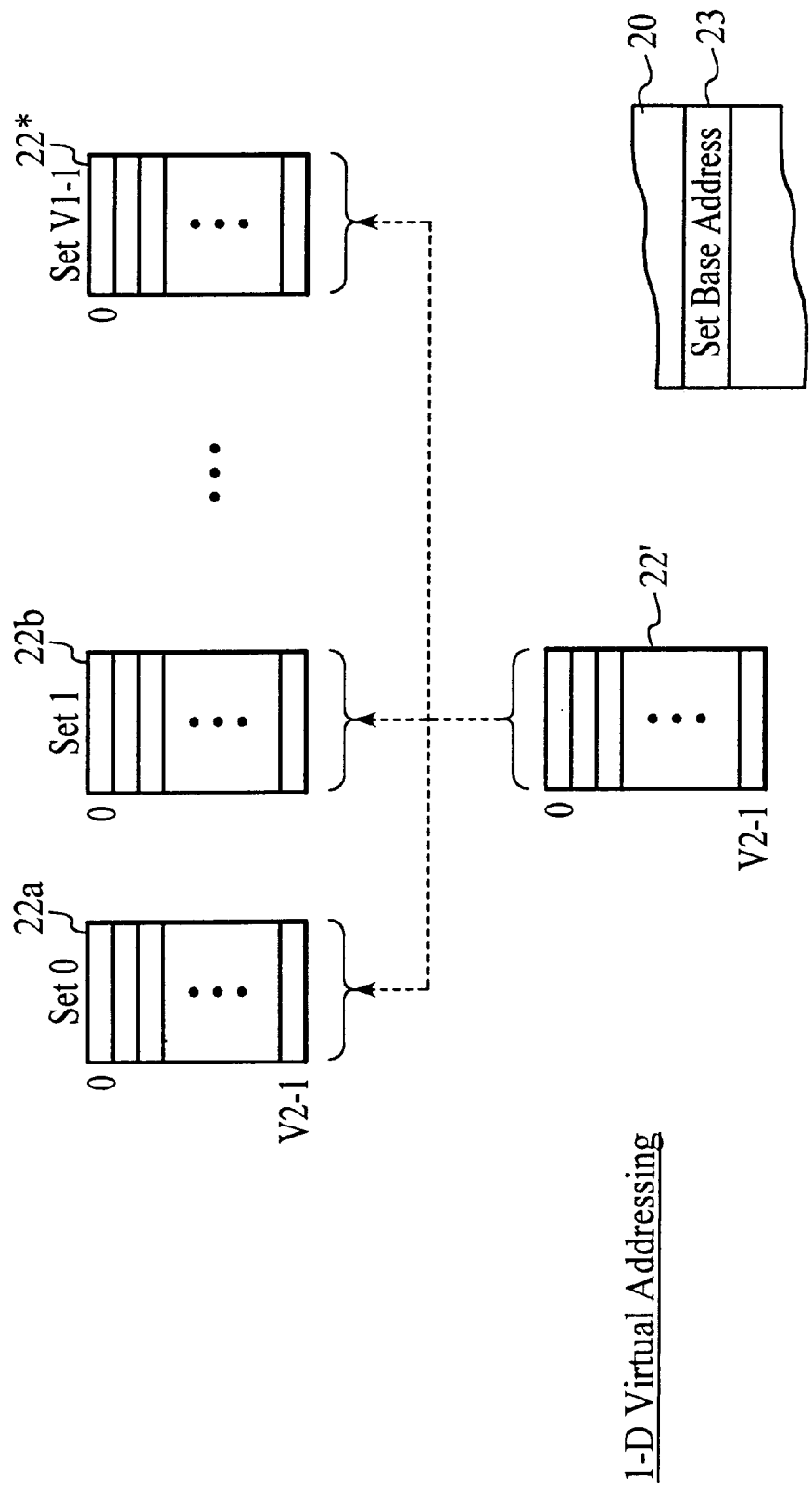
FIGS. 2a–2b illustrate uni/multi-dimensional virtual addressing of the operand register file of FIG. 1 under the present invention.
Figure 2B:
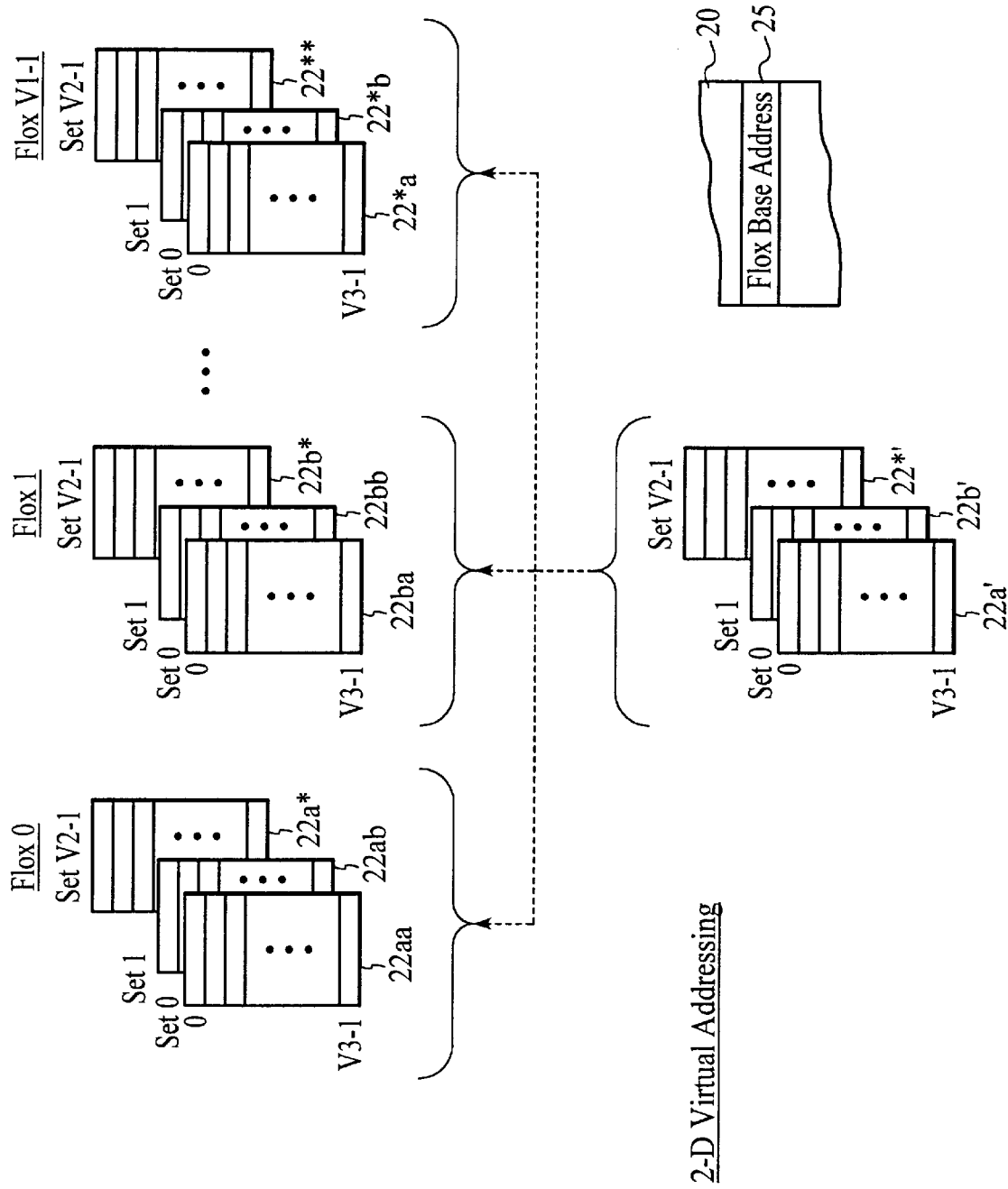
Figure 3C:
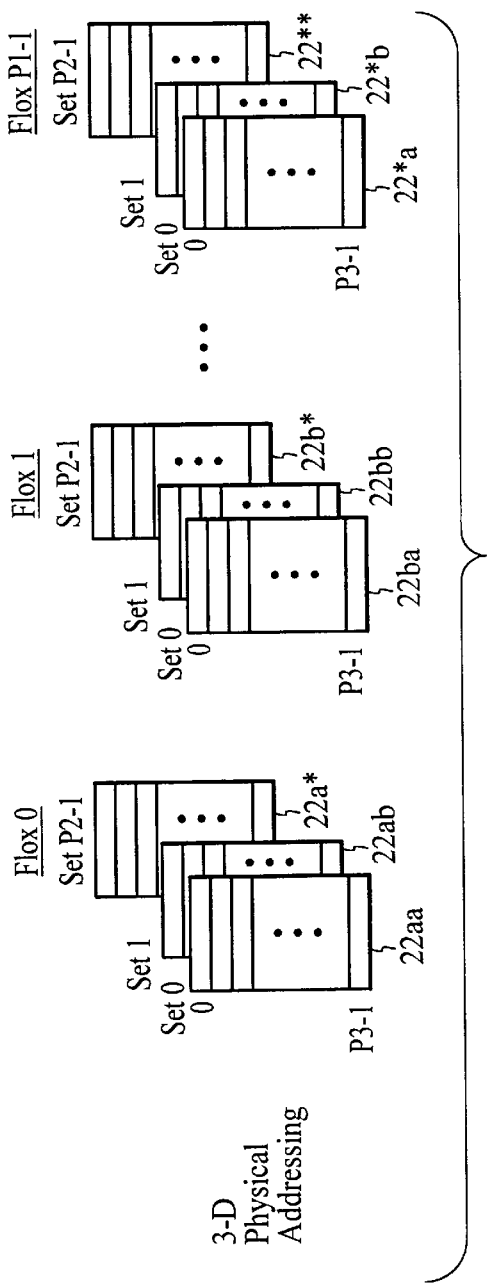
FIGS. 3a–3c illustrate uni/multi-dimensional physical addressing of the operand register file of FIG. 1 under the present invention.
Figure 3B:
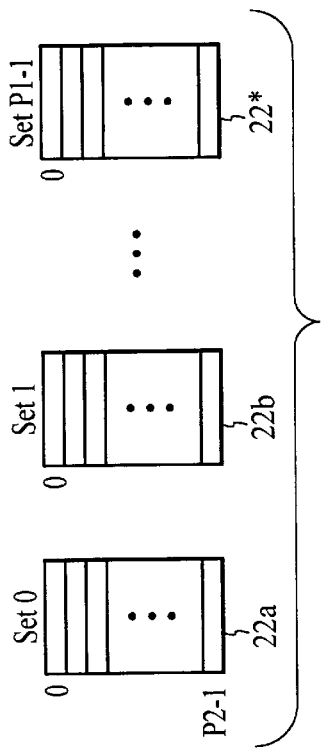
Figure 3A:
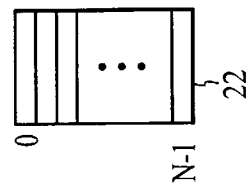

FIGS. 2a–2b and FIGS. 3a–3c illustrate operand register file 22 and the concept of addressing dimension as well as virtual and physical addressing of the present invention in further detail. For a particular embodiment, the number of operand registers (N) provided and the largest number of addressing dimensions (n) employable by the referencing instructions are predetermined. Typically, N is scaled proportionally to n. Each instruction may reference the N operand registers virtually, using up to n–1 addressing dimensions, i.e. 1-D, 2-D, . . . or (n–1)-D virtual addresses, or physically, using up to n addressing dimensions, i.e. 1-D, 2-D, . . . or n-D physical addresses. Up to v1 virtual files of v2, v3×v4, v5×v6×v7 . . . virtual operand registers are available under 1-D, 2-D, 3D . . . virtual addressing respectively, as illustrated in FIGS. 2a–2b; whereas one physical file of N, p1×p2, p3×p4×p5 . . . physical operand registers are available under 1-D, 2-D, 3-D . . . physical addressing respectively, as illustrated in FIGS. 3a–3c (v's and p's are factors of N). In some embodiments, v's and p's are all geometric factors of $(N)^{1/n}$, i.e. $(N)^{1/n}$, $(N)^{2/n}$, $(N)^{3/n}$ etc.

For example, one embodiment may be provided with 64 operand registers and up-to-two addressing dimensions (i.e.

N=64, n=2). For this embodiment, an instruction may refer to the 64 operand registers, virtually, using 1-D virtual addresses, or physically, using 1-D or 2-D physical addresses. Up to 8 virtual files of 8 virtual operand registers 22' are available under 1-D virtual addressing, whereas 1 physical file of 64 and 8×8 physical operand registers 22 and 22a–22\* are available under 1-D and 2-D physical addressing respectively. As a further example, another embodiment may be provided with 512 operand registers and up-to-three addressing dimensions (i.e. N=512, n=3). For this embodiment, an instruction may refer to the 512 operand registers, virtually, using 1-D or 2-D virtual addresses, or physically, using 1-D, 2-D or 3-D physical addresses. Up to 8 virtual files of 64 and 8×8 virtual operand registers 22' and **22a–22\*' are available under 1-D and 2-D virtual addressing respectively, whereas one physical file of 512, 8×64, and 8×8×8 physical operand registers 22, 22a–22\* and 22aa–22\*\*** are available under 1-D, 2-D and 3-D physical addressing respectively.

While on the surface (n–1)-D virtual addressing appears to be "the same" as n-D physical addressing, it is not. A physical operand register address is an operand register address whose operand register addressee is specifically identified, and does not depend on any operand register mapping in effect at the time the reference is made, whereas a virtual operand register address is an operand register address whose operand register addressee is not specifically identified, and depends on the operand register mapping in effect at the time the reference is made. For example, for the above described N=64 and n=2 embodiment, a 2-D physical address of [2,2] specifically means the third operand register of operand register set number two, whose uni-dimensional physical equivalent is physical operand register number 10, whereas a 1-D virtual address of [2] means the third virtual operand register, whose uni-dimensional physical equivalent is physical operand register number 2, 10, 18, 26, 34, 42, 50, or 58 depending on whether the base operand register address in effect is 0, 1, 2, 3, 4, 5, 6,7, or 8.

Figure 4A:
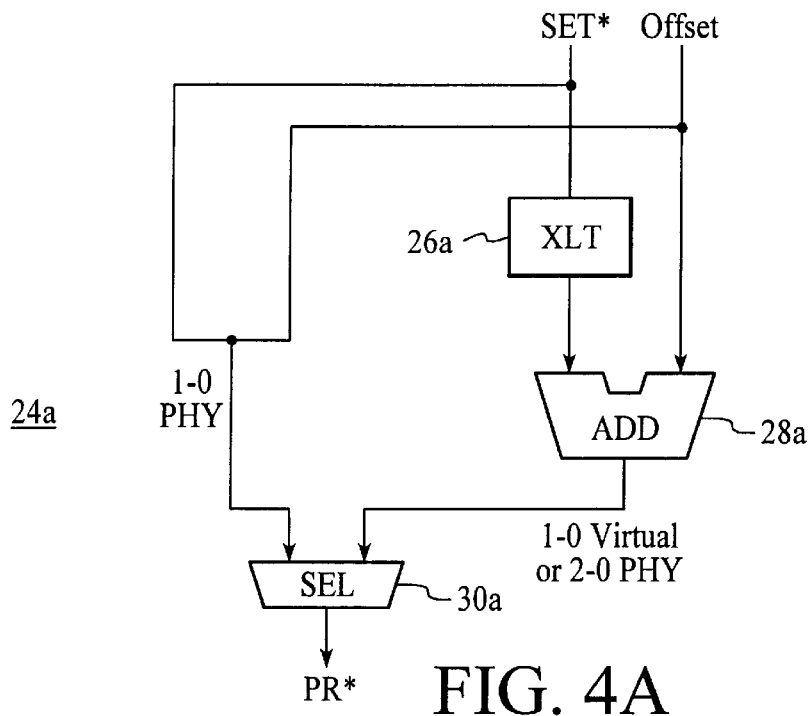
FIGS. 4a–4b illustrate are address mapping circuit of the present invention.
Figure 4B:
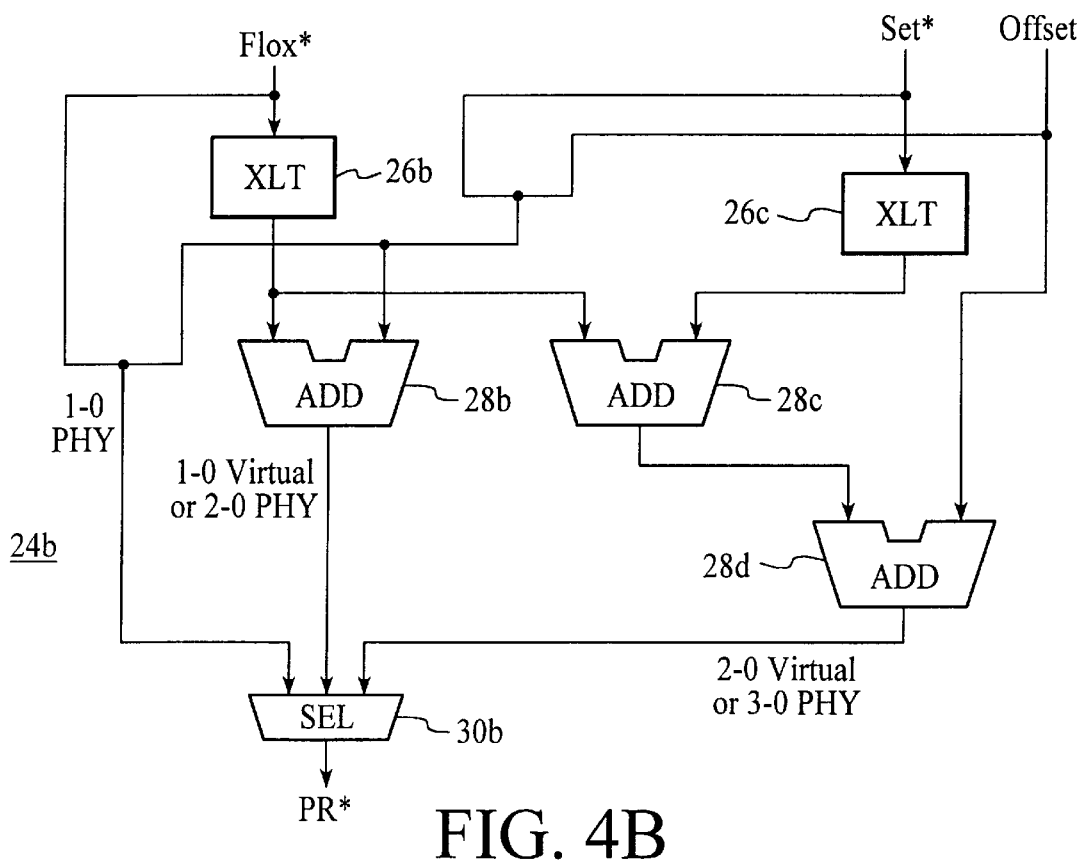

FIGS. 4a–4b illustrate two embodiments of address mapping circuit of execution units 14. For ease of an explanation, only a 2-D and a 3-D embodiment of an address mapping circuit is illustrated. However, based on the description to follow, a person skilled in the art will be able to implement address mapping circuits for embodiments employing addressing dimensions greater than 3-D.

As described earlier, complementary to the N operand registers 22 and the up-to-n addressing dimension instructions, one or more address mapping circuits, e.g. 24a, 24b, equipped to map uni-dimensional virtual and multi-dimensional virtual and physical source/destination addresses to their uni-dimensional physical equivalents are provided to the execution units 14. Preferably, at least three address mapping circuits, e.g. 24a, 24b, are provided to facilitate concurrent mapping of one destination and two source addresses.

Each virtual source/destination address is provided to an address mapping circuit, e.g. 24a, 24b, in n–1 predetermined ordered portions, whereas each physical source/destination address is provided to an address mapping circuit, e.g. 24a, 24b, in n predetermined ordered portions. Along with each virtual source/destination address, an address mapping circuit, e.g. 24a, 24b, is further provided with a base operand register address as the nth ordered portion. Typically, the base operand register address is stored in a control register of the control register file 20. Additionally, along with each source/destination address, an address mapping circuit, e.g. 24a, 24b, is further provided with the addressing dimension of the source/destination address. Accordingly, the address mapping circuit, e.g. 24a, 24b, maps the uni/multi-dimensional virtual/physical source/destination address to its uni-dimensional physical equivalent by selectively translating and/or combining the various ordered portions, and then summing the translated and/or combined portions.

More specifically, if the source/destination address is to be mapped as an (n–1)-D virtual address or n-D physical address, the n higher ordered portions are first translated, then summed, and finally added to the untranslated lowest order portion to generate the uni-dimensional physical equivalent. If the source/destination address is to be mapped as a less than (n–1)-D virtual address or less than n-D physical address, a proportionally reduced number of higher ordered portions are first translated, then summed, and finally added to the combined untranslated remaining lower order portions to generate the uni-dimensional equivalent.

FIG. 4a illustrates a 2-D embodiment of address mapping circuit 24a of execution unit 14. For this embodiment, address mapping circuit 24a comprises translator (XLT) 26a, adder 28a, and selector 30a coupled to each other as shown. Address mapping circuit 24a receives a source/destination address as input in two predetermined ordered portions [Set#] and [Offset]. If the source/destination address is to be mapped as a 1-D virtual address or a 2-D physical address, the higher order portion [Set#] is first translated by XLT 26a, then added to the untranslated lower ordered portion [Offset] by adder 28a to generate the uni-dimensional physical equivalent (PR#). On the other hand, if the source/destination address is to be "mapped" as a 1-D physical address, the two portions [Set#] and [Offset] are simply combined together as [Set#|Offset] to generate the uni-dimensional physical equivalent (PR#). The selection between the 1-D physical and 1-D virtual/2-D physical mapping is made by selector 30a under the control of an addressing dimension indicator to be described in more detail below.

FIG. 4b illustrates a 3-D embodiment of address mapping circuit 24b of execution unit 14. For this embodiment, address mapping circuit 24b comprises translators (XLT) 26b and 26c, adders 28b–28d, and selector 30b coupled to each other as shown. Address mapping circuit 24b receives a source/destination address as input in three predetermined ordered portions [Flox#], [Set#] and [Offset]. If the source/destination address is to be mapped as a 2-D virtual or 3-D physical address, the two higher order portions [Flox#] and [Set#] are first translated by XLT 26b and 26c, then summed by adder 28c, and finally added to the untranslated lowest ordered portion [Offset] by adder 28d to generate the uni-dimensional physical equivalent (PR#). On the other hand, if the source/destination address is to be mapped as a 1-D virtual or 2-D physical address, the highest order portion [Flox#] is first translated by XLT 26b, then added to the combined untranslated remaining lower ordered portions [Set#|Offset] to generate the uni-dimensional physical equivalent (PR#). Lastly, if the source/destination address is to be "mapped" as a 1-D physical address, the three portions [Flox#], [Set#] and [Offset] are simply combined together as [Flox#|Set#|Offset] to generate the uni-dimensional physical equivalent (PR#). The selection between the 1-D physical, 1-D virtual/2-D physical and 2-D virtual/3-D physical mappings is made by selector 30b under the control of the to be described addressing dimension indicator.

FIGS. 5a–5c and FIGS. 6a–6e illustrate a number of embodiments of instructions and control register file 20 of the present invention respectively. For ease of explanation, the descriptions and illustrations will also focus primarily on embodiments that support up to 2-D and 3-D addressing dimensions. However, based on the description to follow, a person skilled in the art will be able to practice the present invention with embodiments supporting more than three addressing dimensions.

Figure 5A:
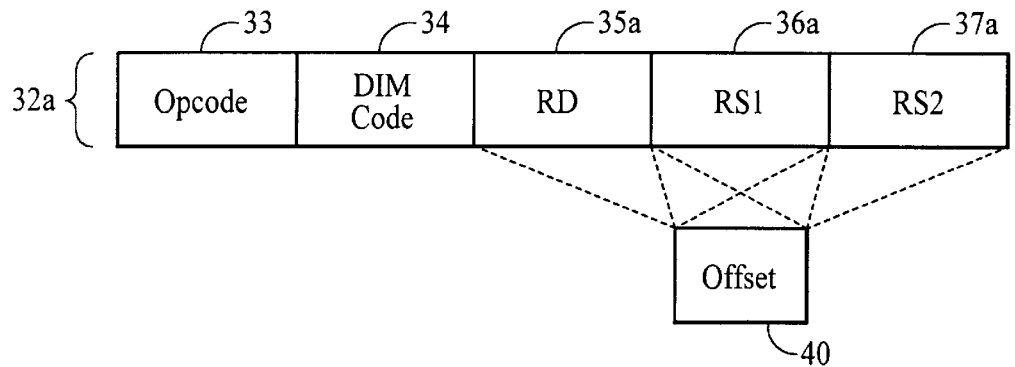
FIGS. 5a–5c illustrate various embodiments of the instructions of the present invention.
Figure 5B:
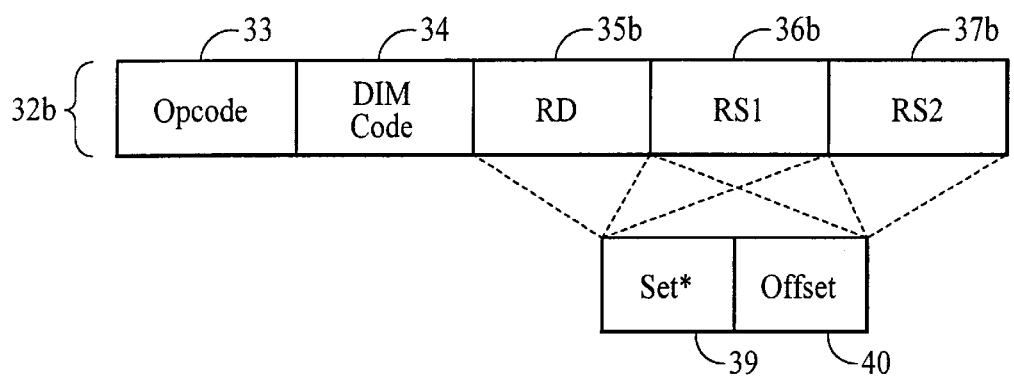
Figure 5C:
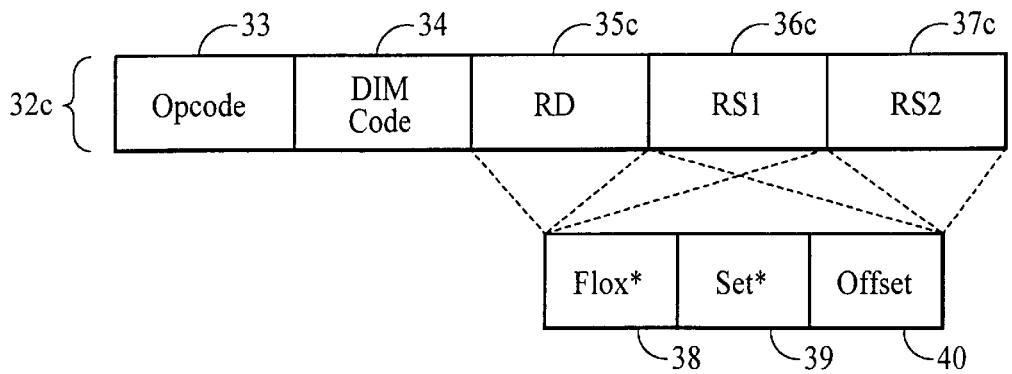

As illustrated in FIGS. 5a–5c, each instruction 32a/32b/32c includes opcode 33, destination address (RD) 35a/35b/35c, source addresses (RS1 and RS2) 36a/36b/36c, and 37a/37b/37c. In some embodiments, whether RD/RS1/RS2 35*/36*/37* is a virtual or a physical address is implicitly inferred from the instruction type (or Opcode 33), as illustrated in FIGS. 5a–5c, whereas in other embodiments, it is explicitly specified (not shown). In some embodiments, RD/RS1/RS2 35*/36*/37* of an instruction are either all virtual addresses, or all physical addresses, whereas in other embodiments, RD/RS1/RS2 35*/36*/37* include virtual as well as physical addresses.

Each RD/RS1/RS2 35*/36*/37* includes one or more of its predetermined portions, e.g. 38, 39, and 40. In some embodiments, all n–1 portions of a virtual and all n portions of a physical RD/RS1/RS2 35*/36*/37* are specified in an instruction 32*, whereas, in other embodiments, one or more higher ordered portions are specified through control registers of the control register file 20. Instruction 32a is an embodiment where RD/RS1/RS2 35a/36a/37a consists of one predetermined portion 40. Instruction 32b is an embodiment where RD/RS1/RS2 35b/36b/37b consists of two predetermined portions 39 and 40, whereas instruction 32c is an embodiment where RD/RS1/RS2 35c/36c/37c consists of three predetermined portions 38–40.

When instructions 32a–32c are used for 1-D, 2-D and 3-D virtual/physical addressing respectively, all one, two and three portions 38–40 of a virtual/physical RD/RS1/RS2 35*/36*/37* are specified in the instruction 32a/32b/32c. For example, in the above described N=64 and n=2 embodiment, if instructions 32a–32b are employed for 1-D and 2-D virtual/physical addressing respectively, the sole portion [Offset] 40 and the two portions [Set#|Offset] 39–40 of RD/RS1/RS2 35*/36*/37* are specified in the instructions 32a–32b respectively. As a further example, in the above described N=512 and n=3 embodiment, if instructions 32a–32c are employed for 1-D, 2-D and 3-D virtual/physical addressing respectively, all one, two and three portions [Offset] 40, [Set#|Offset] 39–40 and [Flox#|Set#|Offset] 38–40 of RD/RS1/RS2 35*/36*/37* are specified in the instructions 32a–32c respectively.

For these embodiments, control register file 20 may be implemented using the "minimal" control register file 20a illustrated in FIG. 6a, which includes a program counter (PC) register 42, a return program counter (Ret_PC) register 44, and a base operand register address (Flox/Set_Ptr) register 48 for virtual operand register address mapping. Each address mapping circuit 24* would receive all n–1 predetermined ordered portions of a virtual RD/RS1/RS2 35*/36*/37* or all n predetermined ordered portions of a physical RD/RS1/RS2 35*/36*/37* from the referencing instructions 32a–32c.

On the other hand, when instructions 32a–32b are used for 2-D and 3-D virtual/physical addressing respectively, not all two and three portions 38–40 of a virtual/physical RD/RS1/RS2 35*/36*/37* are specified in the instruction 32a–32b respectively. For example, in the above described N=64 and n=2 embodiment, if instruction 32a is employed for 2-D physical addressing, only the first portion [Offset] 40 of a physical RD/RS1/RS2 35a/36a/37a is specified in the instruction 32a. As a further example, in the above described N=512 and n=3 embodiment, if instruction 32a–32b are employed for 2-D virtual/physical and 3-D physical addressing respectively, only one portion [Offset] 40 of a virtual/physical RD/RS1/RS2 35a/36a/37a and two portions [Set#|Offset] 39–40 of a physical RD/RS1/RS2 35b/36b/37b are specified in the instructions 32a–32b respectively.

Figure 6E:
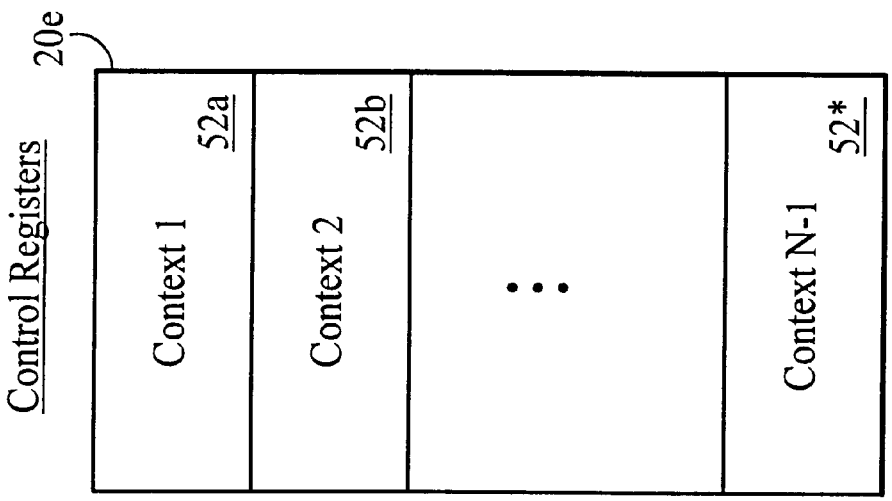
Figure 6D:
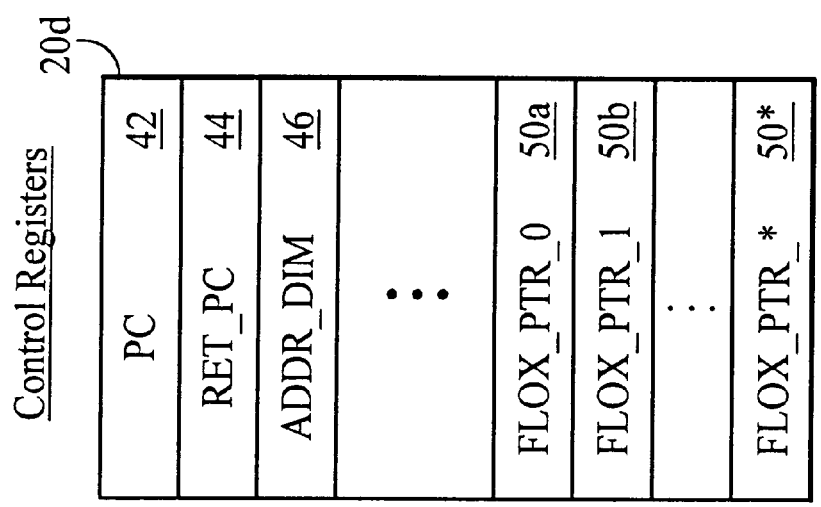

For these embodiments, control register file 20 may be implemented with any one of the "extended" control register files 20b–20d shown in FIGS. 6b–6d accordingly. Each of the "extended" control register files 20a–20d contain additional control registers 48a–48* and 50a–50* for storing one or more of the higher ordered portions of RD/RS1/RS2. Control register file 20b is suitable for up to 2-D addressing, whereas control register files 20c and 20d are both suitable for up to 3-D addressing. Each address mapping circuit 24* would receive one or more of the predetermined portions of a virtual/physical address from control register file 20*, and the remaining predetermined portions of the virtual/physical address from the referencing instructions 32a–32c.

For example, the above described N=64 and n=2 embodiment may be implemented with instruction 32a complemented by control register file 20b; whereas the above described N=512 and n=3 embodiment may be implemented with instruction 32a complemented by control register file 20c, or instruction 32b complemented with control register file 20d. In any case, for these embodiments, by having one or more of the higher ordered predetermined portions, e.g. 38–39, of a virtual/physical source/destination address 35*/36*/37*, specified through a control register of control register file 20*, instruction references to operand registers may be controlled by software. Thus, for a group of instructions, their references may be efficiently "confined" to a particular flox and/or set of operand registers as desired.

Additionally, as illustrated by FIG. 6e, regardless of whether control register file 20a, 20b, 20c, 20d or the like is employed, control register file 20* may be replicated multiple times to create a "super" control register file 20e to facilitate multi-processing for a number of contexts at the same time.

Continuing to refer to FIGS. 5a–5c and FIGS. 6a–6e, as illustrated in FIGS. 5a–5c, in some embodiments, instructions 32* further include an addressing dimension code 34 denoting the addressing dimension of RD/RS1/RS2 35*/36*/37*, i.e. 1-D, 2-D, 3-D etc. In the alternative, as illustrated in FIGS. 6a–6e, in other embodiments, control register file 20* further includes an addressing dimension control register 46 for storing the addressing dimension code 34 to denote the addressing dimension of RD/RS1/RS2 35*/36*/37* of the instructions 32*, thereby also allowing the addressing dimension of RD/RS1/RS2 35*/36*/37* to be controlled by software. Thus, for a group of instructions, their references may be efficiently "confined" to a particular size of addressing dimension as desired.

Additionally, the size of the instructions 32* are also scaled proportionally to N and n. For examples, 16-bit and 32-bit instructions are employed for the 64-operand registers and up-to-2D, and 512-operand registers and up-to-3D embodiments respectively. For the 16-bit instructions 32*, RD, RS1, and RS2 35*/36*/37* are 3-bits in size, whereas for the 32-bit instructions 32*, RD, RS1, and RS2 35*/36*/37* are 6-bits in size.

Having now described the essential elements of the present invention, their utilizations for various processing, including multi-scalar, vector, and/or multi-processing will be described with additional references to the remaining figures.

Figure 7:
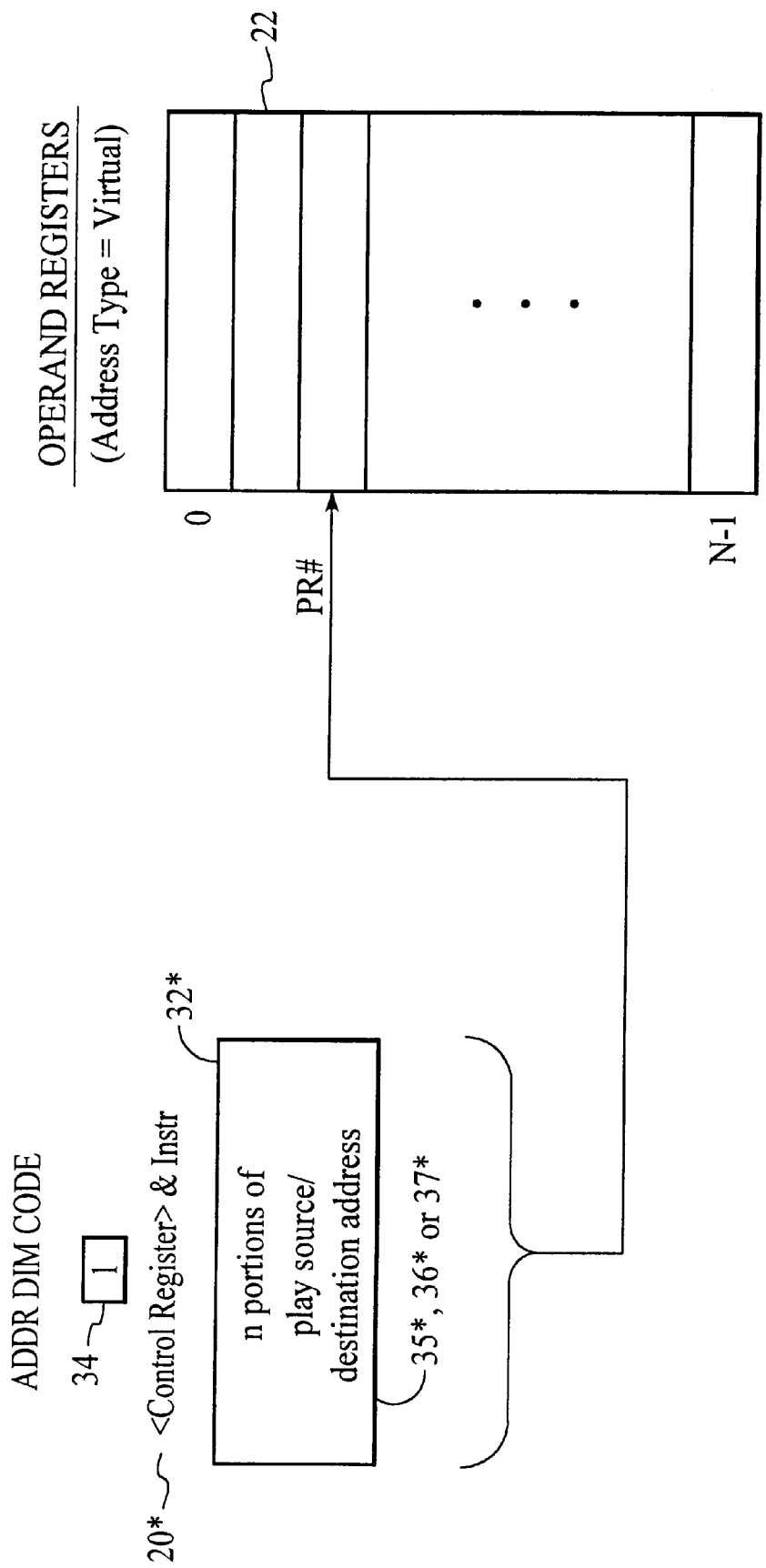
FIG. 7 illustrates multi-scalar processing utilizing the present invention.

FIG. 7 illustrates addressing operand register file 22 in a 1-D physical manner for multi-scalar processing. As shown, by setting addressing dimension code 34 to one, denoting 1-D addressing, as described earlier, "specifying" physical addressing, address mapping circuit 24* simply combines all n predetermined portions of a physical RD/RS1/RS2 35*/36*/37* to generate the PR#. (Recall also from earlier description that one or more of the n, n−1, n−2 etc. portions may be located in a control register.) Thus, operand register file 22 is accessed linearly, suitable for large multi-scalar processing.

For example, for the above described N=64 and n=2 embodiment, by setting address dimension code 34 to 1, "specifying" physical addressing, the two portions of a physical RD/RS1/RS2 35*/36*/37* would be used in a combined manner, thereby referencing the 64 operand registers linearly, suitable for multi-scalar processing. As a further example, for the above described N=512 and n=3 embodiment, by setting address dimension 34 code to 1, "specifying" physical addressing, the three portions of a RD/RS1/RS2 35*/36*/37* would be used in a combined manner, thereby referencing the 512 operand registers linearly, suitable for multi-scalar processing.

Figure 8:
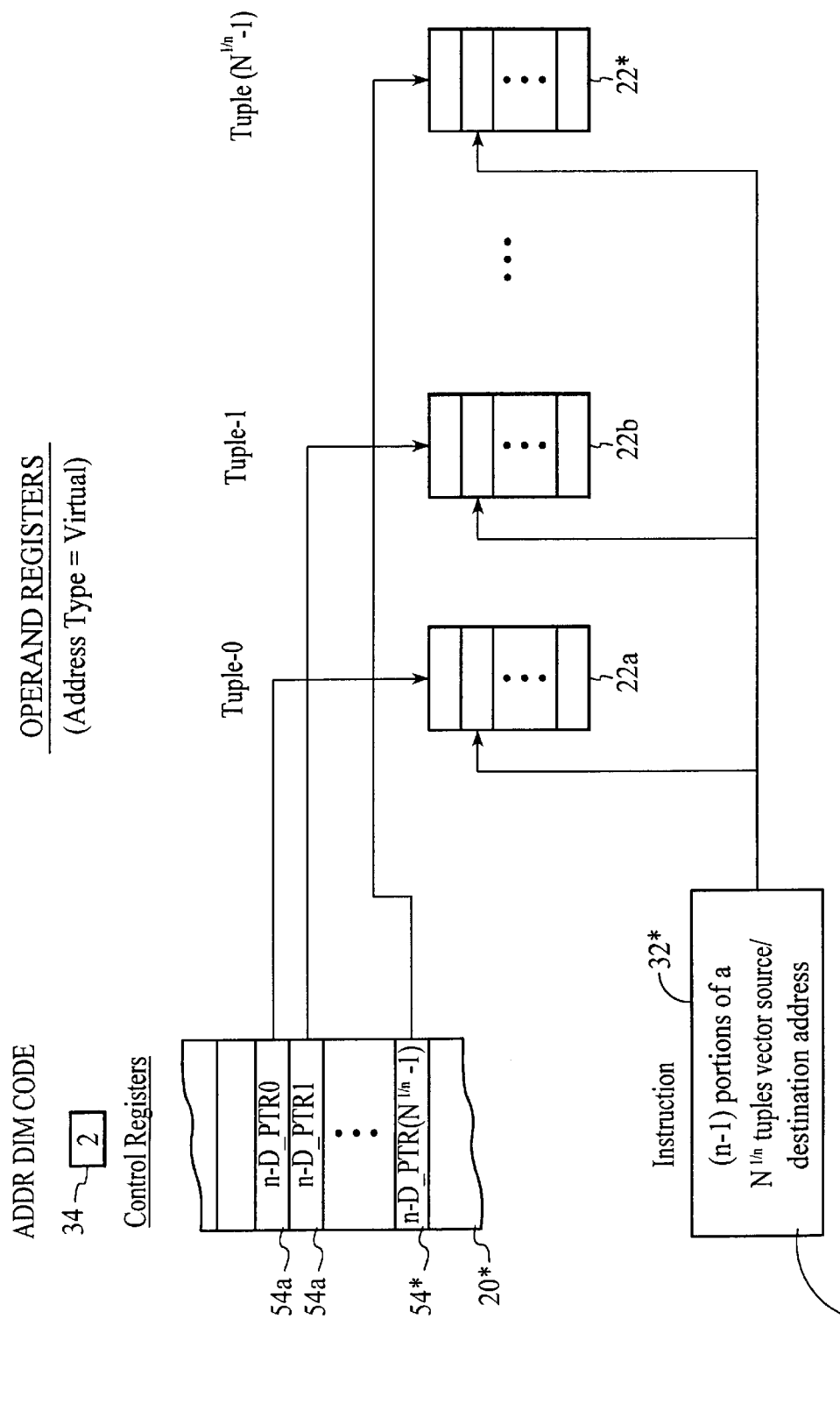
FIG. 8 illustrates vector processing utilizing the present invention.

FIG. 8 illustrates addressing operand register file 22 in a 2-D physical manner for vector processing. As shown, for the illustrated embodiment, by setting addressing dimension code 34 to two, denoting 2-D addressing, "specifying" physical addressing, controlling $N^{1/n}$ $n^{th}$ portions 54a–54* of a $N^{1/n}$-tuple vector RD/RS1/RS2 35*/36*/37* in control register file 20*, as described earlier, providing at least $N^{1/n}$ address mapping circuits 24*, and the same remaining combined n−1 portions of the $N^{1/n}$-tuple vector RD/RS1/RS2 35*/36*/37* of a single $N^{1/n}$-tuple vector instruction 32* to the at least $N^{1/n}$ address mapping circuits 24*, the at least $N^{1/n}$ address mapping circuits 24* would concurrently translate the $n^{th}$ portions 54a–54*, then correspondingly add the same remaining combined n−1 portions of the $N^{1/n}$-tuple vector RD/RS1/RS2 35*/36*/37* of the single $N^{1/n}$-tuple vector instruction 32* to generate $N^{1/n}$ PR# simultaneously. (Note that if $3 \times N^{1/n}$ address mapping circuits 24* are preferably provided, $N^{1/n}$-tuple vector RD, RS1 and RS2 35*/36*/37* can be all mapped simultaneously.) Thus, operand register file 22 is accessed as $N^{1/n} \times N^{(n-1)/n}$ operand registers, suitable for $N^{1/n}$ tuple vector processing.

For example, for the above described N=64 and n=2 embodiment, by setting addressing dimension code 34 to two, denoting 2-D addressing, "specifying" physical addressing, controlling 8 $2^{nd}$ portions 54a–54* of an 8-tuple vector RD/RS1/RS2 35*/36*/37* in control register file 20*, as described earlier, providing at least 8 address mapping circuits 24*, and the same remaining $1^{st}$ portion of the 8-tuple vector RD/RS1/RS2 35*/36*/37* of a single 8-tuple vector instruction 32* to the at least 8 address mapping circuits 24*, the at least 8 address mapping circuits 24* would concurrently translate the $2^{nd}$ portions 54a–54* of the 8-tuple vector RD1/RS1/RS2 35*/36*/37* and then correspondingly add the same $1^{st}$ portion to generate 8 PR# simultaneously, thereby referencing the 64 operand registers as 8×8 2-D operand registers, suitable for 8-tuple vector processing. As a further example, for the N=512 and n=3 embodiment, by setting addressing dimension code 34 to two, denoting 2-D addressing, "specifying" physical addressing, controlling 8 $3^{rd}$ portions 54a–54* of an 8-tuple RD/RS1/RS2 35*/36*37* in control register file 20*, as described earlier, providing at least 8 address mapping circuits 24*, and the same remaining combined $2^{nd}$ and $1^{st}$ portions of the 8-tuple vector RD/RS1/RS2 35*/36*/37* of a single 8-tuple vector instruction 32* to the at least 8 address mapping circuits 24*, the at least 8 address mapping circuits 24* would concurrently translate the $3^{rd}$ portions of the 8-tuple vector RD/RS1/RS2 35*/36*/37* and then correspondingly add the same combined $2^{nd}$ and $1^{st}$ portions to generate 8 PR# simultaneously, thereby referencing the 512 operand registers as 8×64 2-D operand registers, suitable also for 8-tuple vector processing.

Figure 9:
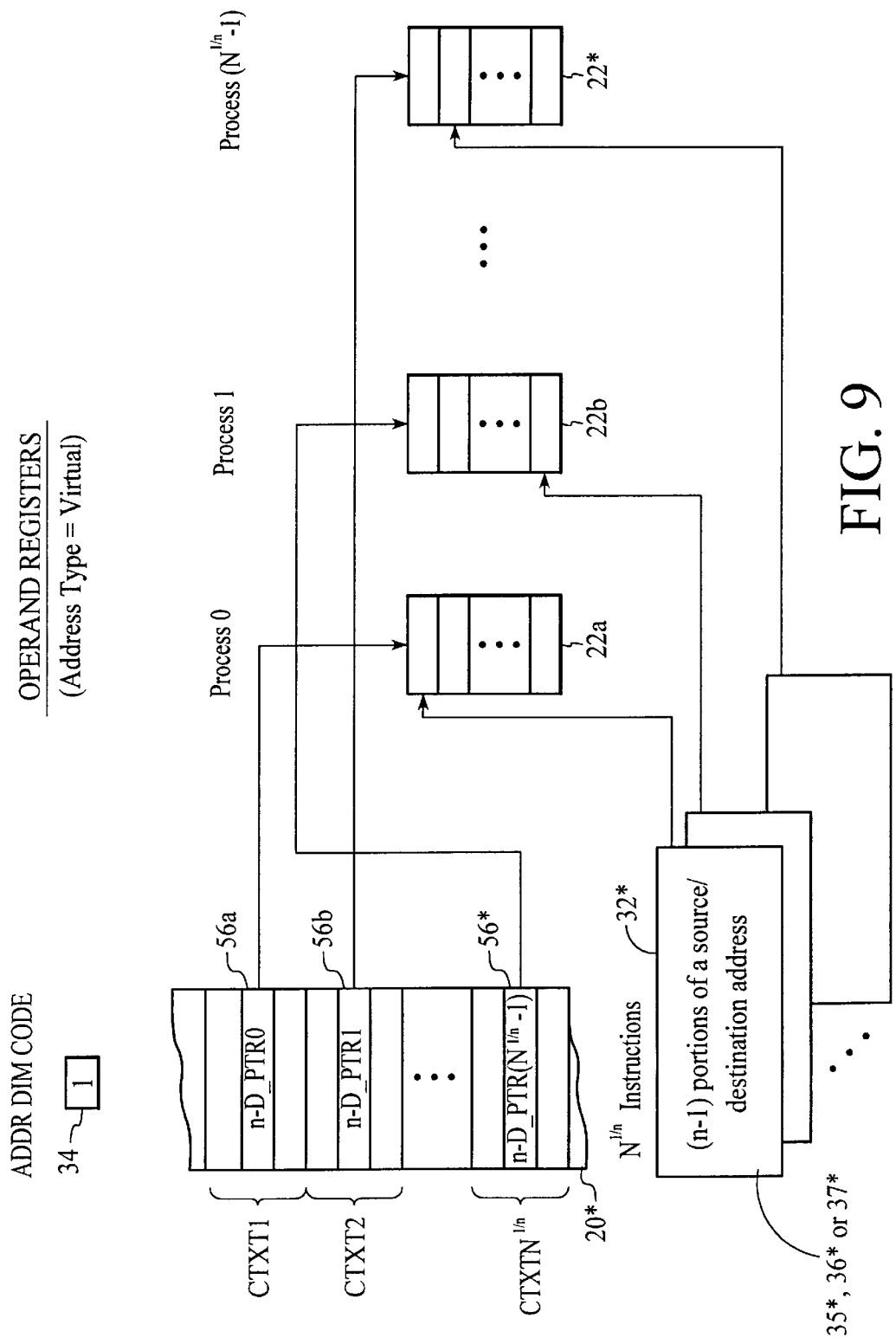
FIG. 9 illustrates multi-processing utilizing the present invention.

FIG. 9 illustrates addressing operand register file 22 in a 1-D virtual manner for multi-processing. As shown, for the illustrated embodiment, by setting addressing dimension code 34 to one, denoting 1-D addressing, implying virtual addressing, controlling $N^{1/n}$ different base operand register addresses 56a–56* for $N^{1/n}$ different contexts in control register file 20*, as described earlier, providing at least $N^{1/n}$ address mapping circuits 24*, and the corresponding remaining combined n−1 portions of the $N^{1/n}$ RD/RS1/RS2's 35*/36*/37* of $N^{1/n}$ different instructions 32* from $N^{1/n}$ different contexts to the at least $N^{1/n}$ address mapping circuits 24*, the at least $N^{1/n}$ address mapping circuits 24* would concurrently translate the $n^{th}$ portions 56a–56*, and then correspondingly add the remaining combined n−1 portions of the $N^{1/n}$ RD/RS1/RS2's 35*/36*/37* of the $N^{1/n}$ different instructions 32* from the $N^{1/n}$ different contexts to generate $N^{1/n}$ PR# simultaneously. (Note that if $3 \times N^{1/n}$ address mapping circuits 24* are preferably provided, $N^{1/n}$ RD, RS1 and RS2 each can be all mapped simultaneously.) Thus, operand register file 22 is accessed as $N^{1/n}$ virtual files of $N^{(n-1)/n}$ virtual operand registers, suitable for $N^{1/n}$ contexts multi-processing.

For example, for the above described N=64 and n=2 embodiment, by setting addressing dimension code 34 to 1, denoting 1-D addressing, implying virtual addressing, controlling 8 different base operand register addresses 56a–56* for 8 different contexts in control register file 20*, as described earlier, providing at least 8 address mapping circuits 24*, and the corresponding remaining $1^{st}$ portions of the 8 RD/RS1/RS2's 35*/36*/37* of 8 different instructions 32* from 8 different contexts to the at least 8 address mapping circuits 24*, the at least 8 address mapping circuits 24* would concurrently translate the $2^{nd}$ portions 56a–56*, and then correspondingly add the $1^{st}$ portions of the 8 RD/RS1/RS2's 35*/36*/37* of the 8 different instructions 32* from the 8 different contexts to generate 8 PR# simultaneously, thereby referencing the 64 operand registers as 8 virtual files of 8 virtual operand registers, suitable for 8 contexts multi-processing. As a further example, for the above described N=512 and n=3 embodiment, by setting addressing dimension code 34 to 1, denoting 1-D addressing, implying virtual addressing, controlling 8 different base operand register addresses 56a–56* for 8 different contexts in control register file 20*, as described earlier, providing at least 8 address mapping circuits 24*, and the corresponding remaining combined $2^{nd}$ and $1^{st}$ portions of the 8 RD/RS1/RS2's 35*/36*/37* of 8 different instructions 32* from 8 different contexts to the at least 8 address mapping circuits 24*, the at least 8 address mapping circuits 24* would concurrently translate the $3^{rd}$ portions 56a–56*, and then correspondingly add the remaining combined $2^{nd}$ and $1^{st}$ portions of the 8 RD/RS1/RS2's 35*/36*/37* of the 8 different instructions 32* from the 8 different contexts to generate 8 PR# simultaneously, thereby referencing the 512 operand registers as 8 virtual files of 64 virtual operand registers, suitable for 8 contexts multi-processing.

Figure 10:
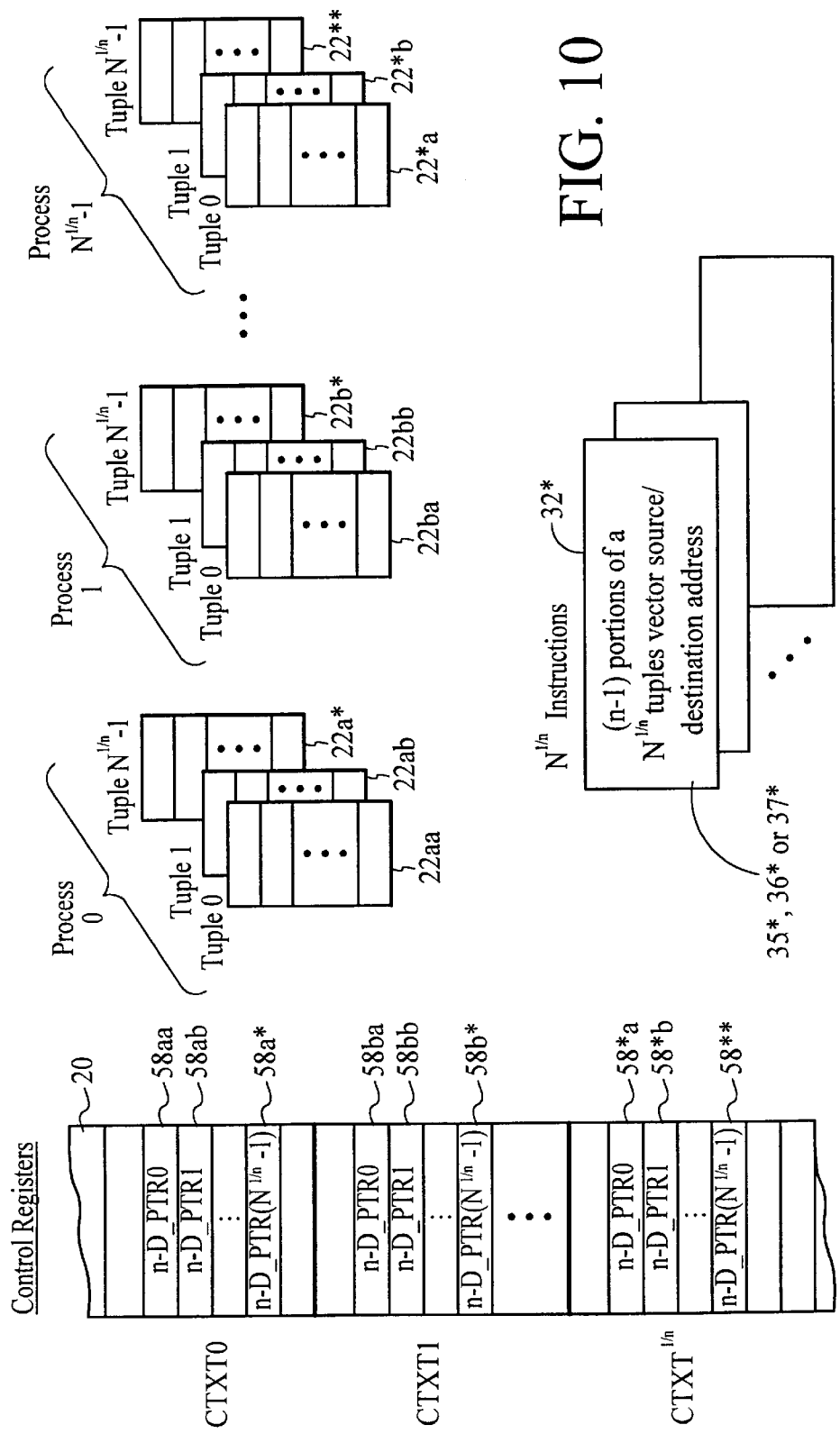
FIG. 10 illustrates multi and vector processing utilizing the present invention.

FIG. 10 illustrates addressing operand register file 22 in a 2-D virtual manner for vector multi-processing. As shown, for the illustrated embodiment, by setting addressing dimension code 34 to two, denoting 2-D addressing, "specifying" virtual addressing, controlling $N^{1/n}$ different base operand register addresses and $N^{1/n}$ sets of $N^{1/n}$ $(n-1)^{th}$ portions 58aa–58** for $N^{1/n}$ different $N^{1/n}$-tuple vector instructions 32* from $N^{1/n}$ different contexts in control register file 20*, as described earlier, providing at least $N^{1/n} \times N^{1/n}$ address mapping circuits 24*, and the $N^{1/n}$ base operand register addresses as well as the $N^{1/n}$ corresponding sets of $N^{1/n}$ identical remaining combined n–2 portions of the $N^{1/n}$-tuple vector RD/RS1/RS2's 35*/36*/37* of $N^{1/n}$ different $N^{1/n}$-tuple vector instructions 32* from $N^{1/n}$ different contexts to the at least $N^{1/n} \times N^{1/n}$ address mapping circuits 24*, the at least $N^{1/n} \times N^{1/n}$ address mapping circuits 24* would concurrently translate $N^{1/n} \times N^{1/n}$ $n^{th}$ as well as $n-1^{th}$ portions 58aa–58**, of $N^{1/n}$ different $N^{1/n}$-tuple vector RD/RS1/RS2's 35*/36*/37* for $N^{1/n}$ different contexts, then correspondingly add $N^{1/n}$ sets of $N^{1/n}$ identical remaining combined n–2 portions of the $N^{1/n}$ $N^{1/n}$-tuple vector RD/RS1/RS2's 35*/36*/37* to generate $N^{1/n} \times N^{1/n}$ PR# simultaneously. (Note that if $3 \times N^{1/n} \times N^{1/n}$ address mapping circuits 24* are preferably provided, $N^{1/n}$ of $N^{1/n}$-tuple vector RD, RS1 and RS2 each can be all mapped simultaneously.) Thus, operand register file 22 is accessed as $N^{1/n}$ virtual files of $N^{1/n} \times N^{(n-2)/n}$ virtual operand registers, suitable for $N^{1/n}$ contexts of $N^{1/n}$-tuple-vector multi-processing.

For example, for the above described N=512 and n=3 embodiment, by setting addressing dimension code 34 to two, denoting 2-D addressing, "specifying" virtual addressing, controlling 8 different base operand register address and 8 different sets of 8 $2^{nd}$ portions 58aa–58** for 8 different 8-tuple vector instructions 32* from 8 different contexts in control register file 20*, as described earlier, providing at least 8×8 address mapping circuits 24*, and the 8 base operand addresses as well as the 8 corresponding sets of 8 identical $1^{st}$ portions of the 8-tuple vector RD/RS1/RS2's 35*/36*/37* of 8 different 8-tuple vector instructions 32* from 8 different contexts to the at least 8×8 address mapping circuits 24*, the at least 8×8 address mapping circuits 24* would concurrently translate 8×8 $3^{rd}$ and $2^{nd}$ portions 58aa–58**, of 8 different 8-tuple vector RD/RS1/RS2's 35*/36*/37* for 8 different 8-tuple vector instructions 32* from 8 different contexts, then correspondingly add 8 sets of 8 identical $1^{st}$ portions of the 8 8-tuple vector RD/RS1/RS2's 35*/36*/37* to generate 8×8 PR# simultaneously, thereby referencing the 512 operand registers as 8 virtual files of 8×8 virtual operand registers, suitable for 8 contexts of 8-tuple-vector multi-processing.

Figure 11A:
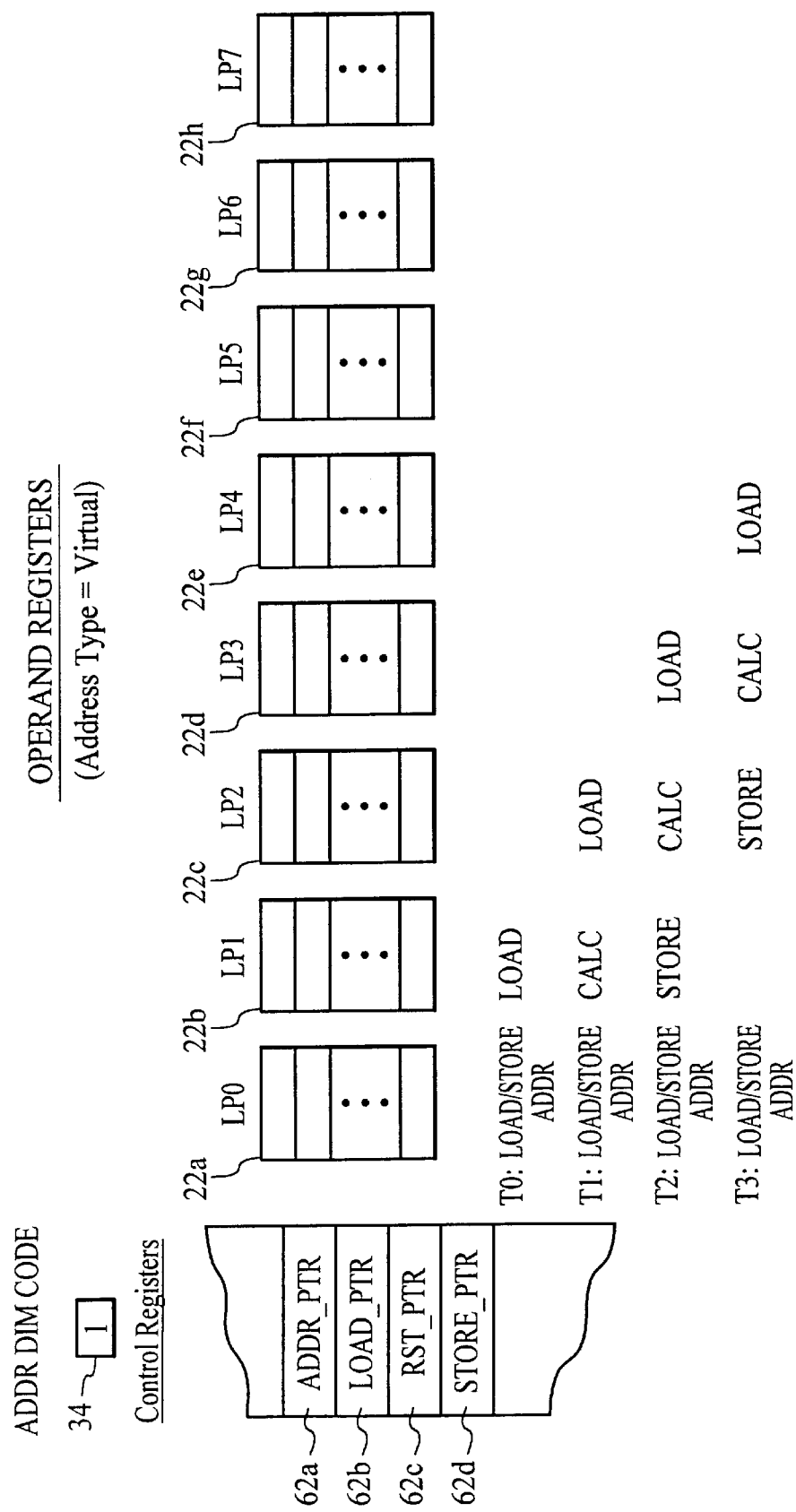
FIGS. 11a–11b illustrate software pipelined load, calculate, and store processing utilizing the present invention.
Figure 11B:
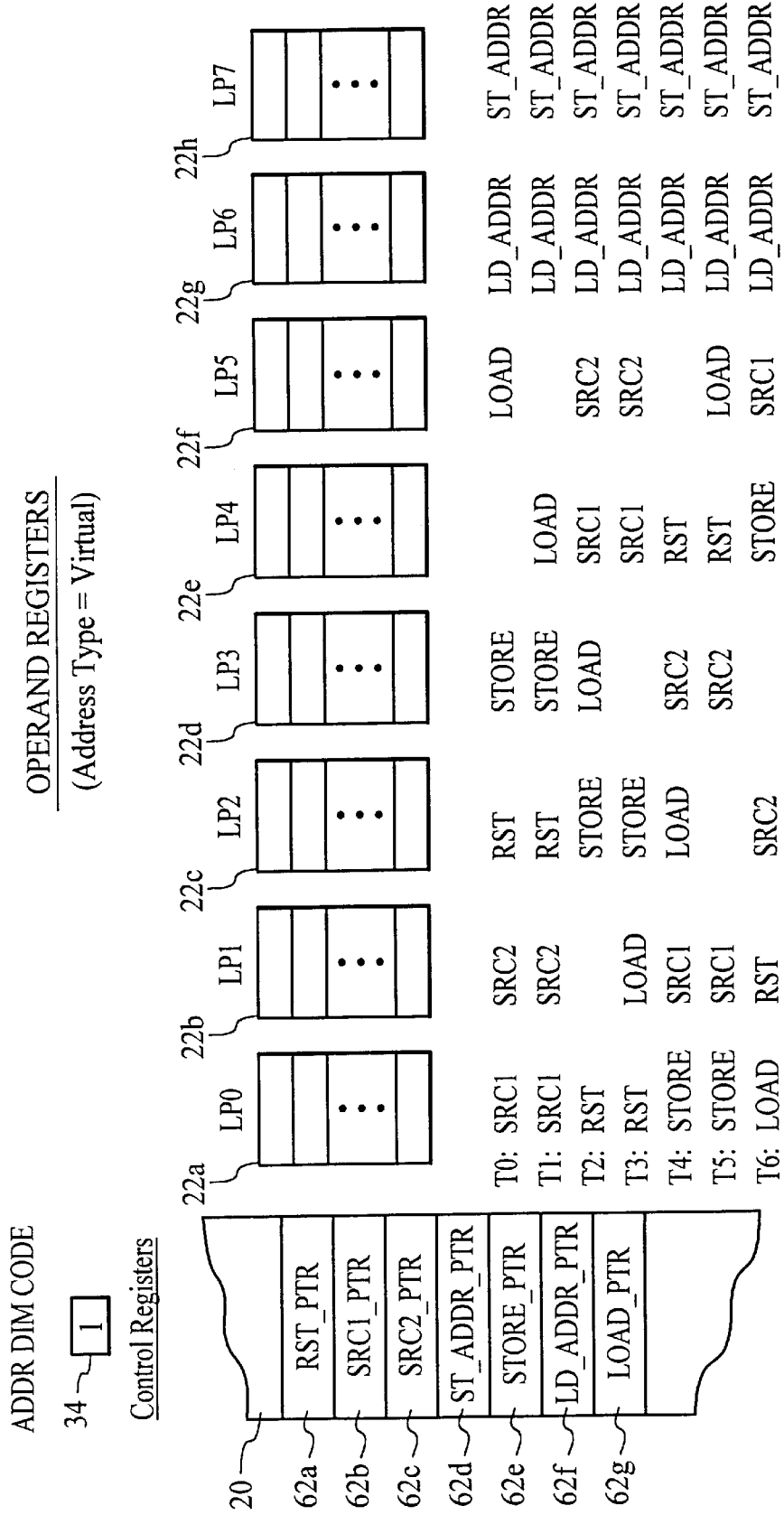

FIGS. 11a–11b illustrate two exemplary approaches to addressing operand register files 20 in a 1-D virtual manner for software pipelined load, calculate, and store processing. As shown in FIG. 11a, by setting addressing dimension code 34 to one, denoting 1-D addressing, "specifying" virtual addressing, controlling four base operand registers addresses (ADDR_PTR, LOAD_PTR, RST_PTR, and STORE_PTR) 60a–60d for address, load, calculate, and store in control register file 20*, as described earlier, providing at least four address mapping circuits 24*, and four virtual RD/RS1/RS2 addresses 35*/36*/37* to the at least four address mapping circuits 24*, the at least four address mapping circuits 24* would generate four PR# simultaneously, as described earlier. (Note that if 3×4 address mapping circuit 24* is preferably provided, four RD, RS1 and RS2 each can be all mapped simultaneously.) For this exemplary illustration, ADDR_PTR 60a is maintained to always map to linear partition zero (LP0) for computing load/store operation addresses. LOAD_PTR 60b, RST_PTR 60c, and STORE_PTR 60d are incremented systematically to map to [LP1, null, null], [LP1, LP2, null], [LP1, LP2, LP3], [LP2, LP3, LP4], etc. for time T0, T1, T2, T3, etc. Thus, at T0, LP1 is referenced by load instructions for loading operands, at T1, it is referenced by the calculation instructions to perform calculation, and at T2, it is referenced by the store instructions to store results back. Therefore, once steady state is reached, at any point in time (such as T2), one LP (LP1) is referenced by the store instructions to store back calculation results, one LP (LP2) is referenced by the calculation instructions to perform calculations, and one LP (LP3) is referenced by the load instructions to pre-load operands. Accordingly, operand register file 22 is accessed with 4 virtual files of $N^{(n-1)/n}$ virtual operand registers, with 1 virtual file having an invariant mapping and the other 3 virtual files having variant mappings, suitable for software pipelined load, calculate, store processing.

For example, for the above described N=64 and n=2 embodiment, by setting addressing dimension code 34 to 1, denoting 1-D addressing, "specifying" virtual addressing, controlling four base operand register addresses 60a–60d for address, load, calculate, and store in control register file 20*, as described earlier, providing at least four address mapping circuits 24*, and four virtual addresses for address, load, calculate, and store to at least four address mapping circuits 24*, the at least four address mapping circuits 24* would generate four PR# simultaneously. Furthermore, maintaining ADDR_PTR 60a and incrementing LOAD_PTR 60b, RST_PTR 60c, and STORE_PTR 60d as described earlier, the 64 operand registers can be referenced with 4 virtual files of 8 virtual operand registers, with 1 virtual file of 8 virtual operand registers having an invariant mapping and the other 3 virtual files of 8 virtual operand registers having variant mappings, suitable for software pipelined load, calculate, and store processing, Similarly, as shown in FIG. 11b by setting addressing dimension code 34 to one, denoting 1-D addressing, "specifying" virtual addressing, controlling 7 base operand registers addresses for result, source1, source2, store address, store, load address, and load (RST_PTR, SRC1_PTR, SRC2_PTR, ST_ADDR_PTR, STORE_PTR, LD_ADDR_PTR, and LOAD_PTR) 62a–62g in control register file 20*, as described earlier, providing at least 7 address mapping circuits 24*, and 7 virtual addresses for result, source1, source2, store address, store, load address, and load to at least 7 address mapping circuits 24*, the at least 7 address mapping circuits 24* would generate 7 PR# simultaneously. For this exemplary illustrations, LD_ADDR_PTR 62f and ST_ADDR_PTR 62d are maintained to map to LP6–LP7 for computing store and load operation addresses. SRC1_PTR 62b, SRC2_PTR 62c, RSTLPTR 62a, STORE_PTR 62e, and LOAD_PTR 62g are incremented systematically to map to [LP0, LP1, LP2, LP3, LP5], [LP0, LP1, LP2, LP3, LP4], [LP4, LP5, LP0, LP2, LP3], [LP4, LP5, LP0, LP1, LP2 ] etc. for times T0, T1, T2, T3, etc. In other words, LOAD_PTR 62g leads SRC1_PTR 62b and SRC2_PTR 62c, and goes twice as fast, with the STORE_PTR 62e always following the RST_PTR 62a. SRC1_PTR 62b, SRC2_PTR 62c and RST_PTR 62a are assigned arbitrarily to any three unused virtual files 22a–22h. Thus, at T0 & T1, LP5 and LP4 are referenced by load instructions to load SRC2 and SRC1 respectively, and at T2 and T3, they are used to supply SRC2 and SRC1.

Concurrently at T2 and T3, LP0 is referenced by calculate instructions for calculation, and at T4 and T5, it is referenced by store instructions to store results back. Therefore, once steady state is reached, at any point in time (such as T5), one LP (LP0) is referenced by the store instructions to store back calculation results, two LPs (LP1 and LP3) are used to supply SRC1 and SRC2, one LP (LP4) is referenced by calculate instructions to perform calculations, and one LP (LP5) is used to pre-load either SRC1 or SRC2. Accordingly, operand register file 22 is accessed with 7 virtual files of $N^{(n-1)/n}$ virtual operand registers, with two virtual files having invariant mappings and the other 5 virtual files having variant mappings, suitable for software pipelined load, calculate, store processing.

For example, for the above described N=512 and n=3 embodiment, by setting addressing dimension code 34 to 1, denoting 1-D addressing, "specifying" virtual addressing controlling 7 base operand register addresses for result, source1, source2, store address, store, calculate, load address, and load in control register file 20\*, as described earlier, providing at least 7 address mapping circuits 24\*, and 7 virtual addresses for calculate, source1, source2, store address, store, load address and load to the at least 7 address mapping circuits 24\*, the at least 7 address mapping circuits 24\* would generate seven PR# simultaneously. Furthermore, maintaining ST_ADDR_PTR 62*d* and LD_ADDR_PTR 62*f*, and incrementing SRC1_PTR 62*b*, SRC2_PTR 62*c*, RST_PTR 62*a*, STORE_PTR 62*e*, and LOAD_PTR 62*g* as described earlier, the 512 operand registers can be referenced as a 7 virtual files of 64 virtual operand registers, with 2 virtual files of 64 virtual operand registers having invariant mappings and the other 5 virtual files of 64 virtual operand registers having variant mappings, suitable for software pipelined load, calculate, and store processing.

Referring now back FIG. 1, as described earlier, it illustrates processor 10 of the present invention. However, as appreciated by those skilled in the art, modern processor developments are typically conducted using software emulators. Thus, FIG. 1 is also intended to represent a model of processor 10 of the present invention being emulated by a software emulator. Given the above description of processor 10, such software emulator is well within the ability of one skilled in the art to implement, and therefore will not be further described.

Thus, a processor having a scalable uni/multi-dimensional and virtually/physically addressed operand register file has been described. The processor can be scaled to various performance design points suitable for multi-scalar, vector, and/or multi-processing, as well as software pipelined load, calculate, and store processing. Furthermore, the various embodiments are upward compatible. Lastly, while the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A processor comprising:
   an operand register file having a plurality of operand registers, the operand register file capable of being provided both as a one-dimensional file of registers corresponding to a first addressing dimension being one and as a multi-dimensional matrix file of registers corresponding to a second addressing dimension being greater than one; and
   execution units coupled to the operand register file for executing instructions that reference the operand registers, wherein at least one of the execution units is capable of executing both first instructions that reference the operand registers using the first addressing dimension and second instructions that reference the operand registers using the second addressing dimension.

2. The processor as set forth in claim 1, wherein,
   the operand register file has 64 operand registers, and
   the first instructions reference the operand registers using one dimensional addressing and the second instructions reference the operand registers using two dimensional addressing.

3. The processor as set forth in claim 1, wherein, the at least one execution unit comprises at least one address mapping circuit for mapping both the first and second dimensional source and destination addresses of the first and second instructions to their uni-dimensional equivalents.

4. The processor as set forth in claim 3, wherein, the at least one address mapping circuit receives each first and second dimensional source/destination address in predetermined ordered portions, and generates the uni-dimensional equivalent by selectively translating and/or combining appropriate portions, and summing the translated and/or combined portions.

5. The processor as set forth in claim 3, wherein, the at least one address mapping circuit receives all portions of each source/destination address from the instruction.

6. The processor as set forth in claim 3, wherein,
   the processor further comprises a control register file having a plurality of control registers; and
   the at least one address mapping circuit receives one or more portions of each source/destination address from a control register of the control register file.

7. The processor as set forth in claim 3, wherein,
   the operand register file has N operand registers;
   the processor supports up to at least two addressing dimensions;
   the second instructions comprise m1-tuple vector instructions having m1-tuple vector source/destination addresses, where m1 is a factor of N;
   the at least one execution unit comprises at least m1 address mapping circuits; and
   the at least m1 address mapping circuits simultaneously generate m1 operand register addresses for the m1-tuple vector source/destination addresses of a m1-tuple vector instruction.

8. The processor as set forth in claim 3, wherein,
   the operand register file has N operand registers;
   the processor supports up to n addressing dimensions;
   the second instructions comprise $N^{1/n}$-tuple vector instructions having $N^{1/n}$-tuple vector source/destination addresses;
   the at least one execution unit comprises at least $N^{1/n}$ address mapping circuits; and
   the at least $N^{1/n}$ address mapping circuits simultaneously generate $N^{1/n}$ operand register addresses for the $N^{1/n}$-tuple vector source/destination addresses of an $N^{1/n}$-tuple vector instruction.

9. The processor as set forth in claim 3, wherein,
   the operand register file has N operand registers;
   the processor supports up to at least two addressing dimensions and concurrently executes up to m1 processes, where m1 is a factor of N;
   the at least one execution unit comprises at least m1 address mapping circuits; and the at least m1 address mapping circuits simultaneously generate at least one operand register address for each concurrently executing process.

10. The processor as set forth in claim 3, wherein, the operand register file has N operand registers;

the processor supports up to n addressing dimensions and concurrently executes up to $N^{1/n}$ processes;

the at least one execution unit comprises at least $N^{1/n}$ address mapping circuits; and the at least $N^{1/n}$ address mapping circuits simultaneously generate at least one operand register address for each concurrently executing process.

11. The processor as set forth in claim 3, wherein, the operand register file has N operand registers;

the processor supports up to at least three addressing dimensions and concurrently executes up to m1 processes comprising m2-tuple vector instructions having m2-tuple vector source/destination addresses, where m1 and m2 are factors of N;

the second instructions comprise m2-tuple vector instructions having m2-tuple vector source/destination addresses;

the at least one execution unit comprises at least m1×m2 address mapping circuits; and the at least m1×m2 address mapping circuits simultaneously generate at least m2 operand register addresses for each concurrently executing process.

12. The processor as set forth in claim 3, wherein, the execution units execute load, calculate, and store instructions in a software pipelined manner, and comprise at least three address mapping circuits; and the at least three address mapping circuits simultaneously generate at least one operand register address for each of the load, calculate, and store instructions.

13. The processor as set forth in claim 3, wherein, the execution units execute load-address, store-address, load, calculate, and store instructions in a software pipelined manner, and comprise at least five address mapping circuits; and the at least five address mapping circuits simultaneously generate at least one operand register address for each of the load-address, store-address, load, calculate, and store instructions.

14. The processor as set forth in claim 3, wherein, the at least one address mapping circuit maps source/destination addresses of an instruction in accordance with an addressing dimension indicator.

15. The processor as set forth in claim 14, wherein, the at least one address mapping circuit receives the addressing dimension indicator from the instruction.

16. The processor as set forth in claim 14, wherein, the processor further comprises a control register file having a plurality of control registers; and the at least one address mapping circuit receives the addressing dimension indicator from a control register of the control register file.

17. The processor as set forth in claim 1, wherein:

the operand registers have corresponding physical addresses, and, the at least one execution unit is further capable of executing third instructions that reference the operand registers using virtual addresses different than the corresponding physical addresses.

18. The processor as set forth in claim 1, wherein, the processor is a general purpose microprocessor.

19. The processor as set forth in claim 1, wherein, the processor is a digital signal processor.

20. A processor comprising:

an operand register file having a plurality of operand registers; and execution units coupled to the operand register file for executing instructions that reference the operand registers in variable uni/multidimensional addressing, wherein, the operand register file has 512 operand registers, and the instructions reference the operand registers using one, two or three dimensional addressing.

21. A processor comprising:

an operand register file having a plurality of operand registers; and execution units coupled to the operand register file for executing instructions that reference the operand registers in variable uni/multidimensional addressing, wherein, the operand register file has 4096 operand registers, and the instructions reference the operand registers using one, two, three or four dimensional addressing.

22. A processor comprising:

an operand register file having a plurality of operand registers; and execution units coupled to the operand register file for executing instructions that reference the operand registers in variable uni/multidimensional addressing, the execution units comprising at least one address mapping circuit for mapping uni/multidimensional source and destination addresses of the instructions to their uni-dimensional equivalents, wherein, the operand register file has N operand registers;

the processor supports up to n addressing dimensions and concurrently executes up to $N^{1/n}$ processes comprising $N^{1/n}$-tuple vector instructions having $N^{1/n}$-tuple vector source/destination addresses, n being at least two;

the instructions comprise $N^{1/n}$-tuple vector instructions having $N^{1/n}$-tuple vector source/destination addresses;

the execution units comprise at least $N^{1/n} \times N^{1/n}$ address mapping circuits; and the at least $N^{1/n} \times N^{1/n}$ address mapping circuits simultaneously generate at least $N^{1/n}$ operand register addresses for each concurrently executing process.

23. A processor comprising:

an operand register file having a plurality of operand registers, the operand registers having corresponding physical addresses, the operand register file capable of being provided both as a physical file of registers that are referenced using the corresponding physical addresses and as one or more virtual files of registers that are referenced using virtual addresses different than the corresponding physical addresses; and execution units coupled to the operand register file for executing instructions that reference the operand registers, at least one of the execution units being capabile of executing first instructions that reference the operand registers using the corresponding physical addresses and second instructions that reference the operand registers using the virtual addresses.

24. The processor as set forth in claim 23, wherein, the at least one execution unit is further capable of executing third instructions that reference the operand registers using a first addressing dimension being one and fourth instructions that reference the operand registers using a second addressing dimension being greater than one.

25. A computer system comprising:

an operand register file having a plurality of operand registers, the operand register file capable of being provided both as a one-dimensional file of registers corresponding to a first addressing dimension being one and as a multi-dimensional matrix file of registers corresponding to a second addressing dimension being greater than one; and execution units coupled to the operand register file for executing instructions that reference the operand registers, wherein at least one of the execution units is capable of executing both first instructions that reference the operand registers using the first addressing dimension and second instructions that reference the operand registers using the second addressing dimension.

26. A computer system comprising:

an operand register file having a plurality of operand registers, the operand registers having corresponding physical addresses, the operand register file capable of being provided both as a physical file of registers that are referenced using the corresponding physical addresses and as one or more virtual files of registers that are referenced using virtual addresses different than the corresponding physical addresses; and execution units coupled to the opened register file for executing instructions that reference the operand registers, at least one of the execution units being capable of executing first instructions that reference the operand registers using the corresponding physical addresses and second instructions that reference the operand registers using the virtual addresses.

27. A processor for processing microcode including first instructions employing m-dimensional addressing and second instructions; employing n-dimensional addressing, m being different from n, said processor comprising:

an operand register file having a plurality of operand registers, the operand register file capable of being provided both as a m-dimensional file of registers and as a n-dimensional file of registers; and execution units coupled to the operand register file for executing both said first and second instructions, said first and second instructions referencing said operand registers using said m-dimensional addressing and said n-dimensional addressing, respectively.

28. A processor as defined in claim 27, wherein each of the operand registers has a physical one-dimensional address, said processor further comprising a mapping circuit that maps the m-dimensional addresses of said first instructions and the n-dimensional addresses of said second instructions to said physical one-dimensional address of corresponding ones of said operand registers.

* * * * *